(12) United States Patent
Han et al.

(10) Patent No.: US 8,861,530 B2
(45) Date of Patent: Oct. 14, 2014

(54) METHOD AND APPARATUS FOR TRANSMITTING CONTROL INFORMATION IN A WIRELESS COMMUNICATION SYSTEM

(75) Inventors: Seung Hee Han, Anyang-si (KR); Jae Hoon Chung, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 13/636,555

(22) PCT Filed: Mar. 23, 2011

(86) PCT No.: PCT/KR2011/001987
§ 371 (c)(1),
(2), (4) Date: Sep. 21, 2012

(87) PCT Pub. No.: WO2011/118975
PCT Pub. Date: Sep. 29, 2011

(65) Prior Publication Data
US 2013/0010742 A1    Jan. 10, 2013

Related U.S. Application Data

(60) Provisional application No. 61/316,393, filed on Mar. 23, 2010.

(30) Foreign Application Priority Data

Jan. 10, 2011    (KR) .................. 10-2011-0002267

(51) Int. Cl.
*H04L 12/28*    (2006.01)
*H04W 72/04*    (2009.01)
*H04L 27/26*    (2006.01)
*H04L 1/00*    (2006.01)
*H04J 13/00*    (2011.01)
*H04W 72/00*    (2009.01)
*H04L 5/00*    (2006.01)
*H04L 1/18*    (2006.01)

(52) U.S. Cl.
CPC ........ *H04W 72/0413* (2013.01); *H04J 13/0048* (2013.01); *H04W 72/00* (2013.01); *H04J 13/0074* (2013.01); *H04L 27/2636* (2013.01); *H04L 5/0094* (2013.01); *H04J 13/0059* (2013.01); *H04L 1/1861* (2013.01); *H04L 5/0053* (2013.01); *H04L 1/0031* (2013.01); *H04J 13/0003* (2013.01)
USPC ............ 370/394; 370/329; 370/364; 370/464

(58) Field of Classification Search
CPC .................................................. H04W 72/04
See application file for complete search history.

(56) References Cited

U.S. PATENT DOCUMENTS

| | | | | |
|---|---|---|---|---|
| 8,472,471 B2 * | 6/2013 | Yang et al. | .................... | 370/464 |
| 8,526,387 B2 * | 9/2013 | Yang et al. | .................... | 370/329 |
| 2012/0002593 A1 * | 1/2012 | Kim et al. | .................... | 370/315 |

(Continued)

FOREIGN PATENT DOCUMENTS

| | | |
|---|---|---|
| WO | WO 2008/157462 | 12/2008 |
| WO | WO 2009/057286 | 5/2009 |

(Continued)

*Primary Examiner* — Robert Wilson
(74) *Attorney, Agent, or Firm* — Mckenna Long & Aldridge LLP

(57) ABSTRACT

The present invention relates to a wireless communication system. More particularly, the present invention relates to a method and apparatus for transmitting a plurality of PUCCHs in a wireless communication system, wherein the method comprises the following steps: checking a resource for a first PUCCH among the plurality of PUCCHs; inferring, from the resource for the first PUCCH, a resource for the remaining one or more second PUCCHs excluding the first PUCCH among the plurality of PUCCHs; and transmitting the plurality of PUCCHs simultaneously via corresponding relevant resources.

12 Claims, 24 Drawing Sheets

(56) References Cited

U.S. PATENT DOCUMENTS

| | | | |
|---|---|---|---|
| 2012/0294272 A1* | 11/2012 | Han et al. | 370/329 |
| 2012/0300726 A1* | 11/2012 | Han et al. | 370/329 |
| 2012/0320813 A1* | 12/2012 | Han et al. | 370/311 |
| 2013/0010724 A1* | 1/2013 | Han et al. | 370/329 |
| 2013/0010742 A1* | 1/2013 | Han et al. | 370/329 |
| 2013/0022017 A1* | 1/2013 | Han et al. | 370/329 |
| 2013/0022019 A1* | 1/2013 | Han et al. | 370/329 |
| 2013/0039307 A1* | 2/2013 | Han et al. | 370/329 |
| 2013/0044653 A1* | 2/2013 | Yang et al. | 370/280 |
| 2013/0044720 A1* | 2/2013 | Nakao et al. | 370/329 |
| 2013/0058302 A1* | 3/2013 | Kim et al. | 370/329 |

FOREIGN PATENT DOCUMENTS

| | | |
|---|---|---|
| WO | WO 2009/096698 | 8/2009 |
| WO | WO 2009/120843 | 10/2009 |

* cited by examiner

FIG. 5
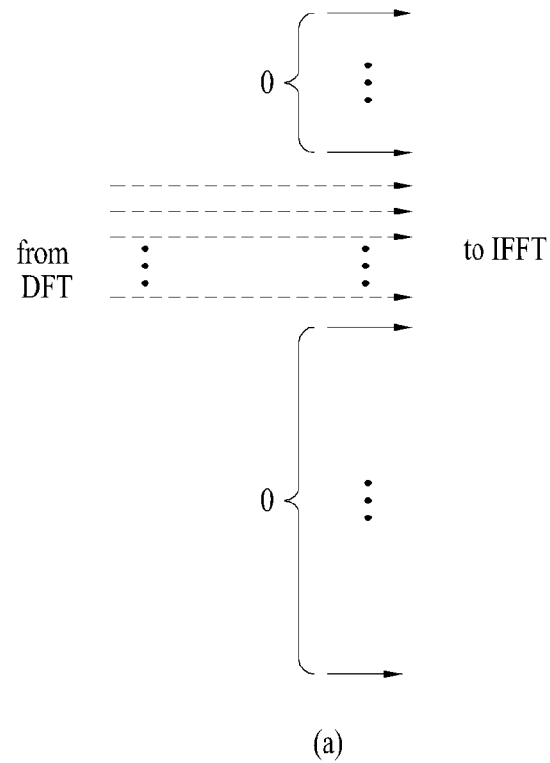
(a)
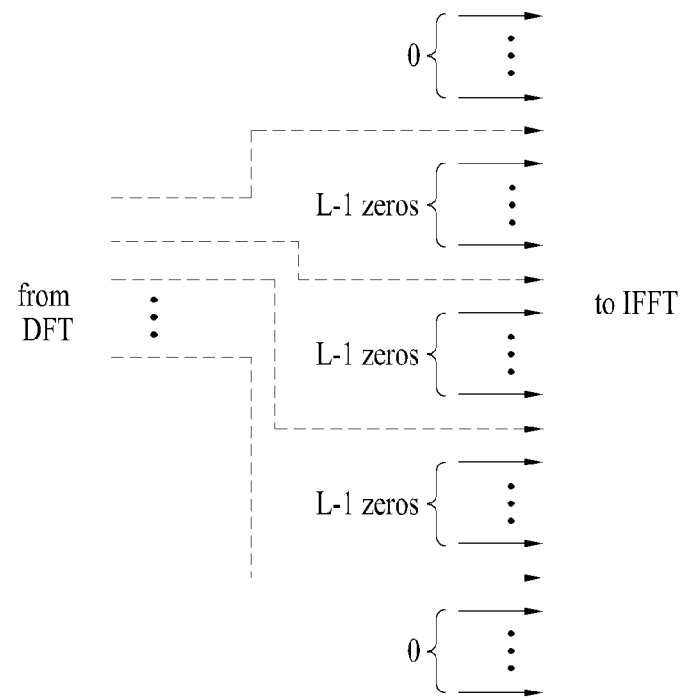
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\overline{n}_{OC} = 0$ | $\overline{n}_{OC} = 1$ | $\overline{n}_{OC} = 2$ | $n_{OC} = 0$ | $n_{OC} = 1$ | $n_{OC} = 2$ |
| $n_{CS} = 1$ | $n_{CS} = 0$ | n' = 0 | | 12 | n' = 0 | | 12 |
| 2 | 1 | | 6 | 13 | | 6 | 13 |
| 3 | 2 | 1 | 7 | 14 | 1 | 7 | 14 |
| 4 | 3 | | 8 | 15 | | 8 | 15 |
| 5 | 4 | 2 | | 16 | 2 | | 16 |
| 6 | 5 | | 9 | 17 | | 9 | 17 |
| 7 | 6 | 3 | 10 | | 3 | 10 | |
| 8 | 7 | | | | | | |
| 9 | 8 | 4 | 11 | | 4 | 11 | |
| 10 | 9 | | | | | | |
| 11 | 10 | 5 | | | 5 | | |
| 0 | 11 | | | | | | |

$\Delta_{shift}^{PUCCH} \in \{\{1,2,3\}$ for normal cyclic prefix $\{1,2,3\}$ for extended cyclic prefix $\delta_{offset}^{PUCCH} \in \{0,1,...,\Delta_{shift}^{PUCCH} - 1\}$ Cell specific cyclic shift offset $n_{OC}$    Orthogonal sequence index for ACK/NACK
$\overline{n}_{OC}$    Orthogonal sequence index for RS
$n_{CS}$    Cyclic shift value of a CAZAC sequence
n'    ACK/NACK resource index used for the channelization in a RB Cell-specific Cyclic shift value of CAZAC sequence

METHOD AND APPARATUS FOR TRANSMITTING CONTROL INFORMATION IN A WIRELESS COMMUNICATION SYSTEM

This application is a 35 U.S.C. §371 National Stage Entry of International Application No. PCT/KR2011/001987, filed Mar. 23, 2011 and claims the benefit of U.S. Provisional Application No. 61/316,393, filed Mar. 23, 2010 and Korean Application No. 10-2011-0002267, filed Jan. 10, 2011, all of which are incorporated by reference in their entirety herein.

TECHNICAL FIELD

The present invention relates to a wireless communication system, and more particularly to a method and apparatus for transmitting control information (channel) in a wireless communication system supporting carrier aggregation (CA).

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DISCLOSURE

Technical Problem

Accordingly, the present invention is directed to a method and apparatus for efficiently transmitting control information (channel) in a wireless communication system that substantially obviate one or more problems due to limitations and disadvantages of the related art. An object of the present invention is to provide a method and apparatus for efficiently transmitting control information (channel) in a wireless communication system. Another object of the present invention is to provide resource allocation for efficiently transmitting control information (channel) and an apparatus for the same.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for simultaneously transmitting a plurality of physical uplink control channel (PUCCHs) by a user equipment (UE) in a wireless communication system, the method including recognizing resources of a first PUCCH from among the plurality of PUCCHs; inferring, from the first PUCCH resources, resources of the remaining one or more second PUCCHs other than the first PUCCH from among the plurality of PUCCHs; and simultaneously transmitting the plurality of PUCCHs through corresponding resources.

In another aspect of the present invention, a user equipment (UE) configured to simultaneously transmit a plurality of physical uplink control channel (PUCCHs) in a wireless communication system includes: a radio frequency (RF) unit; and a processor, wherein the processor recognizes resources of a first PUCCH from among the plurality of PUCCHs, infers, from the first PUCCH resources, resources of the remaining one or more second PUCCHs other than the first PUCCH from among the plurality of PUCCHs, and simultaneously transmits the plurality of PUCCHs through corresponding resources.

The recognizing of the first PUCCH resources may include: receiving a physical downlink control channel (PUCCH); and recognizing PUCCH resources linked to the lowest control channel element (CCE) used for transmission of the PDCCH.

The first PUCCH resources may be given through higher layer signaling.

A resource index of the one or more second PUCCHs may be inferred by applying an offset value to a resource index of the first PUCCH.

The resources of the one or more second PUCCHs may be inferred from the first PUCCH resources so that the plurality of PUCCHs is transmitted through the same physical resource block (PRB).

The resources of the one or more second PUCCHs may be obtained from the following equation:

$$(a+\delta_n) \bmod (N_{CS} \cdot N_{OC} + n_{PRB} \cdot N_{CS} \cdot N_{OC}), \text{ or}$$

$$(a-\delta_n) \bmod (N_{CS} \cdot N_{OC} + n_{PRB} \cdot N_{CS} \cdot N_{OC}) \quad \text{[Equation]}$$

where 'a' is a resource index of the first PUCCH, $\delta_n$ is an offset value for an n-th second PUCCH, $N_{CS}$ is the number of cyclic shifts (CSs) available within one PRB, $N_{OC}$ is the number of orthogonal covers (OCs) available within one PRB, and $n_{PRB}$ is a PRB index on which the first PUCCH resources exist.

Advantageous Effects

Exemplary embodiments of the present invention have the following effects. The embodiments of the present invention can efficiently transmit control information (channel) in a wireless communication system. In addition, resources for transmitting control information (channel) can be efficiently allocated.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a signal mapping scheme in a frequency domain so as to satisfy single carrier characteristics.

FIG. 17 is a diagram showing ACK/NACK channelization of PUCCH formats 1a and 1b.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

In a wireless communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
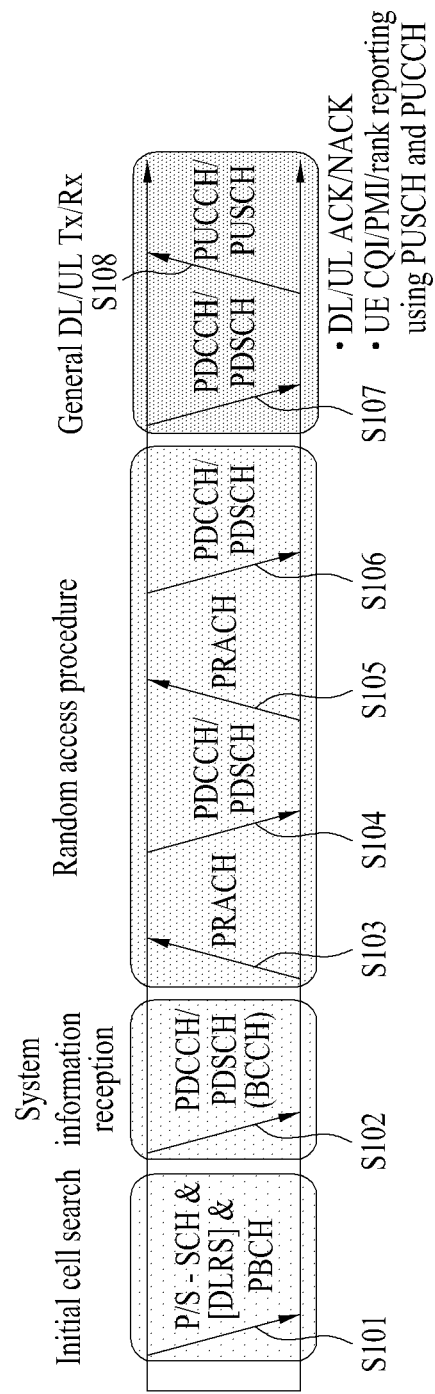
FIG. 1 is a conceptual diagram illustrating physical channels used in a 3GPP LTE system acting as an exemplary mobile communication system and a general method for transmitting a signal using the physical channels.

FIG. 1 is a conceptual diagram illustrating physical channels for use in a 3GPP system and a general method for transmitting a signal using the physical channels.

Referring to FIG. 1, when powered on or when entering a new cell, a UE performs initial cell search in step S101. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S102.

Thereafter, if the UE initially accesses the BS, it may perform random access to the BS in steps S103 to S106. For random access, the UE may transmit a preamble to the BS on a Physical Random Access CHannel (PRACH) in step S103 and receive a response message for the random access on a PDCCH and a PDSCH corresponding to the PDCCH in step S104. In the case of contention-based random access, the UE may transmit an additional PRACH in step S105, and receive a PDCCH and a PDSCH corresponding to the PDCCH in step S106 in such a manner that the UE can perform a contention resolution procedure.

After the above random access procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure. Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), Channel Quality Indictor (CQI), a Precoding Matrix Index (PMI), and a Rank Indicator (RI). The UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
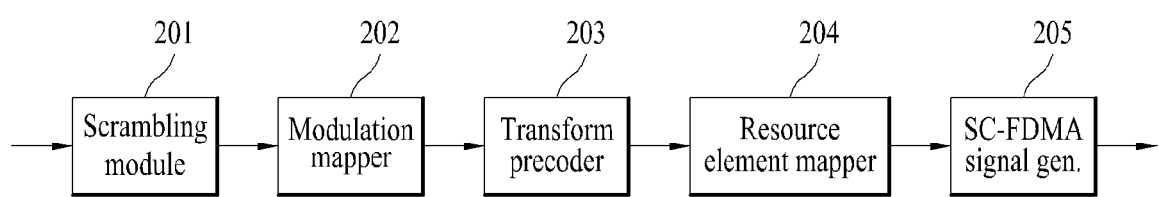
FIG. 2 is a conceptual diagram illustrating a method for processing an uplink signal.

FIG. 2 is a conceptual diagram illustrating a signal processing method for transmitting an uplink signal by a user equipment (UE).

Referring to FIG. 2, the scrambling module 201 may scramble a transmission signal in order to transmit the uplink signal. The scrambled signal is input to the modulation mapper 202, such that the modulation mapper 202 modulates the scrambled signal to complex symbols in Binary Phase Shift Keying (BPSK), Quadrature Phase Shift Keying (QPSK), or 16-ary Quadrature Amplitude Modulation (16QAM) according to the type of the transmission signal and/or a channel status. A transform precoder 203 processes the complex symbols and a resource element mapper 204 may map the processed complex symbols to time-frequency resource elements, for actual transmission. The mapped signal may be transmitted to the BS through an antenna after being processed in a Single Carrier-Frequency Division Multiple Access (SC-FDMA) signal generator 205.

Figure 3:
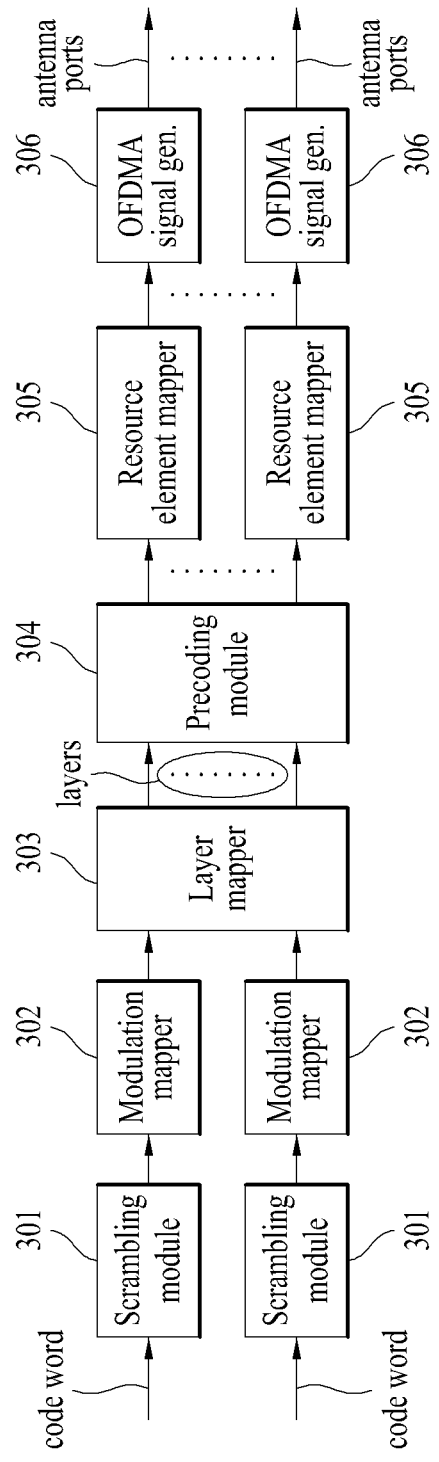
FIG. 3 is a conceptual diagram illustrating a method for processing a downlink signal.

FIG. 3 is a conceptual diagram illustrating a signal processing method for transmitting a downlink signal by a base station (BS).

Referring to FIG. 3, the BS can transmit one or more codewords via a downlink in a 3GPP LTE system. Codewords may be processed as complex symbols by the scrambling module 301 and the modulation mapper 302 in the same manner as in the uplink operation shown in FIG. 2. Thereafter, the complex symbols are mapped to a plurality of layers by the layer mapper 303, and each layer is multiplied by a predetermined precoding matrix and is then allocated to each transmission antenna by the precoder 304. The processed transmission signals of individual antennas are mapped to time-frequency resource elements (REs) to be used for data transmission by the RE mapper 305. Thereafter, the mapped result may be transmitted via each antenna after passing through the OFDMA signal generator 306.

In the case where a UE for use in a wireless communication system transmits an uplink signal, a Peak to Average Power Ratio (PAPR) may become more serious than in the case where the BS transmits a downlink signal. Thus, as described in FIGS. 2 and 3, the SC-FDMA scheme is used for uplink signal transmission in a different way from the OFDMA scheme used for downlink signal transmission.

Figure 4:
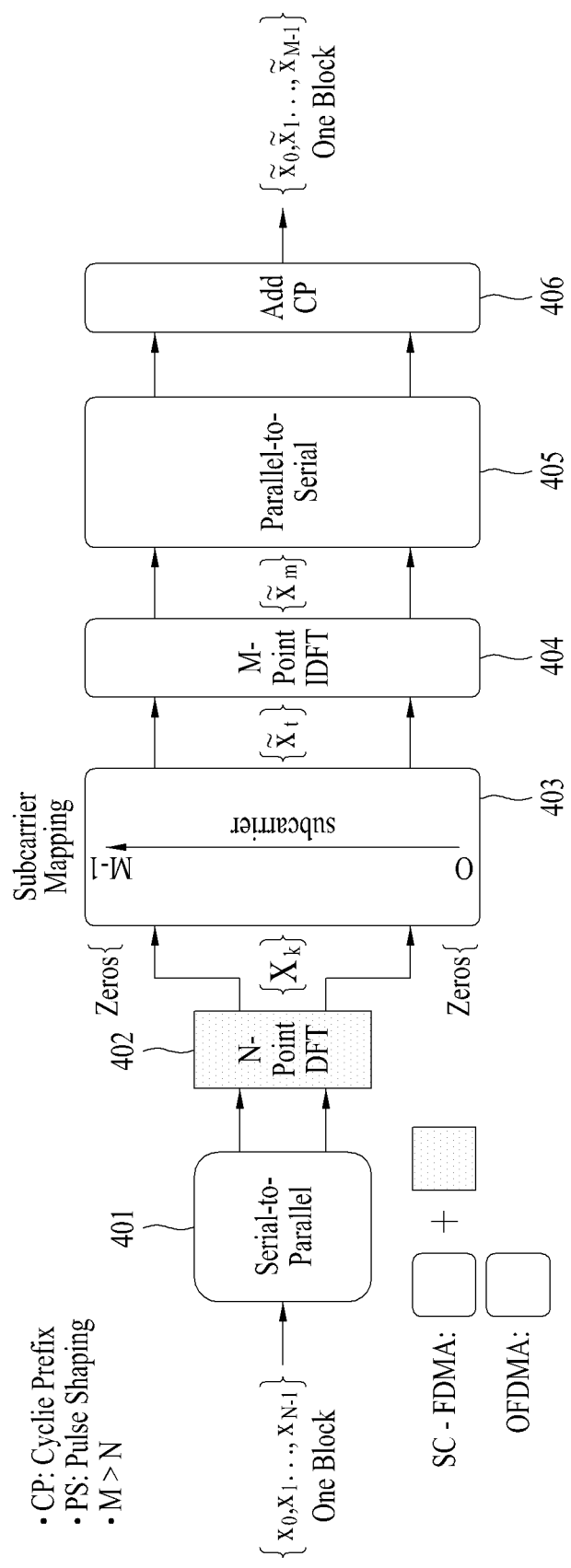
FIG. 4 is a conceptual diagram illustrating an SC-FDMA scheme and an OFDMA scheme applicable to embodiments of the present invention.

FIG. 4 is a conceptual diagram illustrating an SC-FDMA scheme and an OFDMA scheme applicable to embodiments of the present invention. In the 3GPP system, the OFDMA scheme is used in downlink and the SC-FDMA scheme is used in uplink.

Referring to FIG. 4, not only a UE for uplink signal transmission but also a BS for downlink signal transmission includes a Serial-to-Parallel converter 401, a subcarrier mapper 403, an M-point IDFT module 404 and a Cyclic Prefix (CP) addition module 406. However, a UE for transmitting a signal using the SC-FDMA scheme further includes an N-point DFT module 402, and compensates for a predetermined part of the IDFT processing influence of the M-point IDFT module 1504 so that a transmission signal can have single carrier characteristics (i.e., single-carrier properties).

FIG. 5 illustrates a signal mapping scheme in the frequency domain for satisfying the single carrier properties. FIG. 5 (a) shows a localized mapping scheme and FIG. 5 (b) shows a distributed mapping scheme.

A clustered SC-FDMA scheme which is a modified form of the SC-FDMA scheme is described as follows. In the clustered SC-FDMA scheme, DFT process output samples are divided into sub-groups in a subcarrier mapping procedure and are non-contiguously mapped in the frequency domain (or subcarrier domain).

Figure 6:
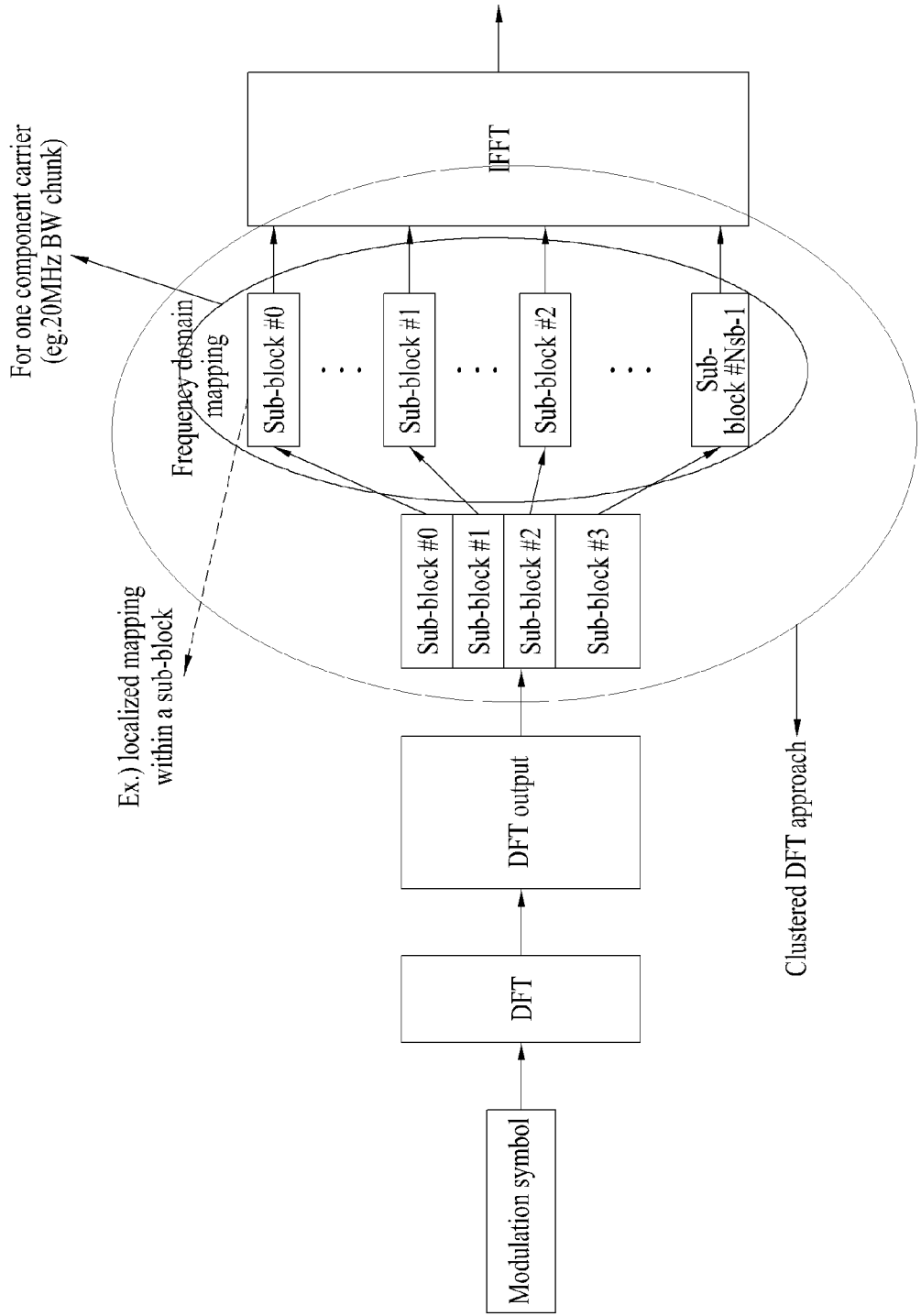
FIG. 6 is a conceptual diagram illustrating the signal processing for mapping DFT process output samples to a single carrier in a clustered SC-FDMA.
Figure 7:
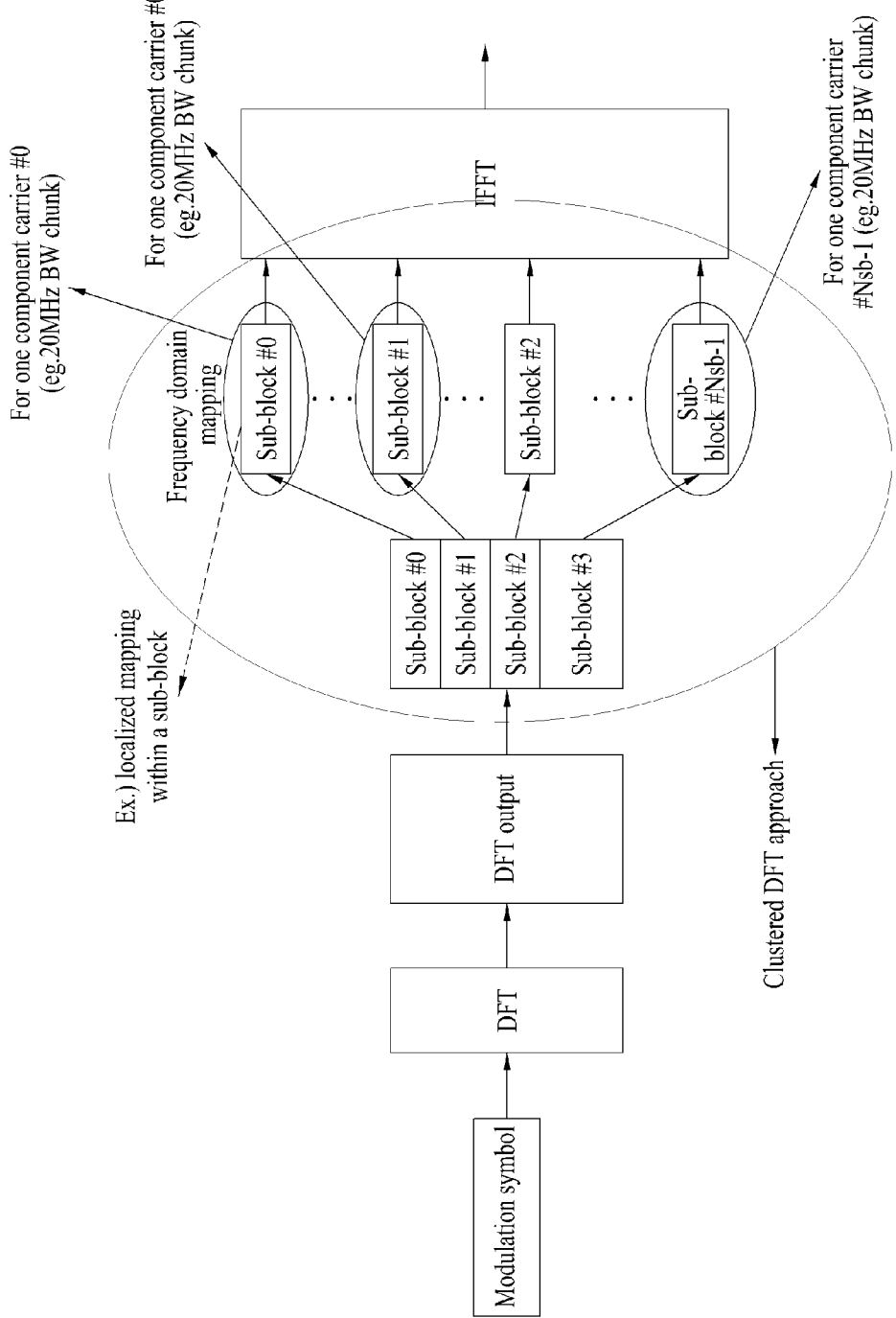
FIGS. 7 and 8 show the signal processing in which DFT process output samples are mapped to multiple carriers in a clustered SC-FDMA.
Figure 8:
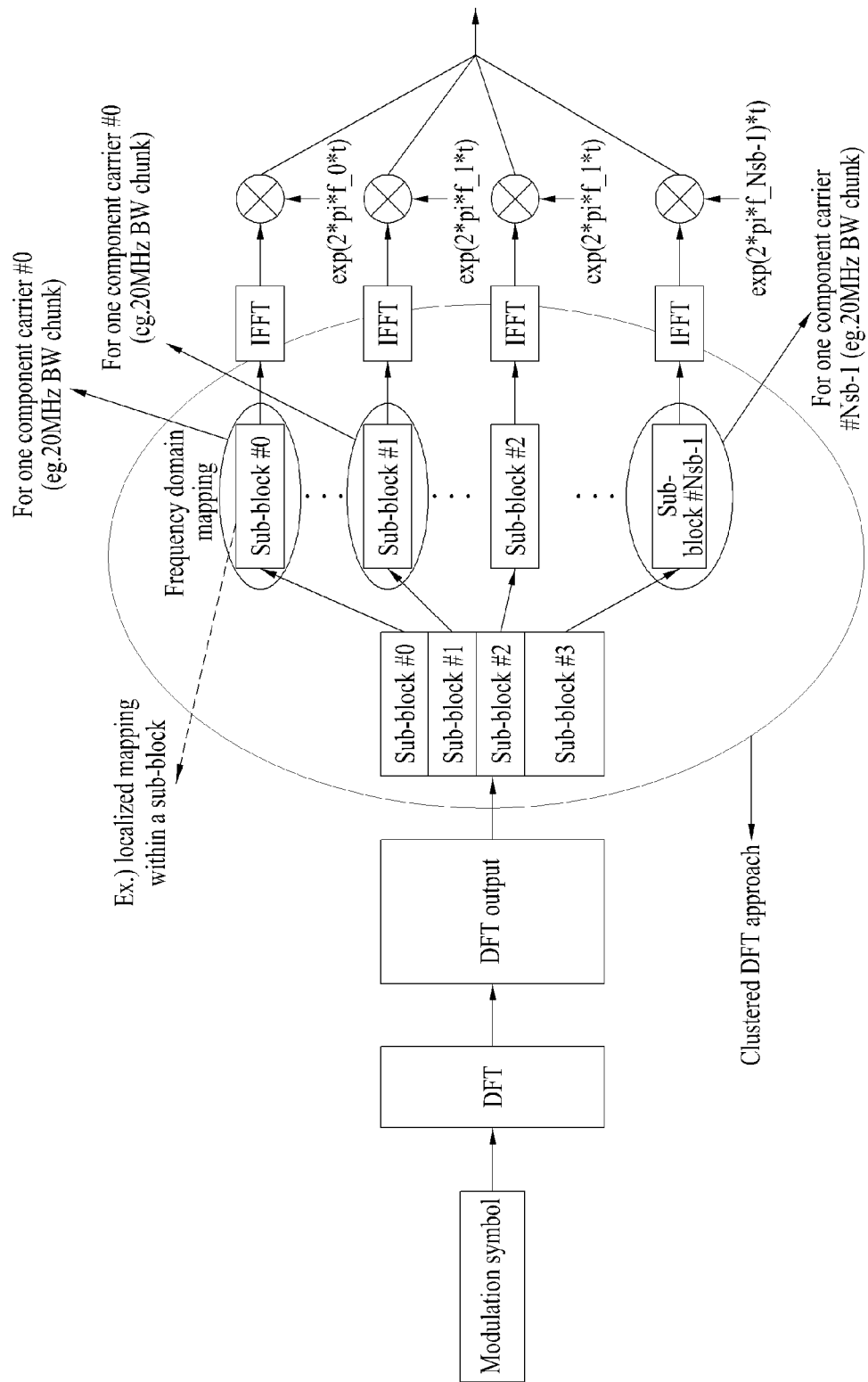

FIG. 6 shows signal processing in which DFT-process output samples are mapped to one carrier in the clustered SC-FDMA. FIGS. 7 and 8 show signal processing in which DFT process output samples are mapped to multicarriers in a clustered SC-FDMA. FIG. 6 shows the example of intra-carrier cluster SC-FDMA application. FIGS. 7 and 8 show examples of the inter-carrier clustered SC-FDMA application. FIG. 7 shows the example in which a signal is generated through a single IFFT block under the condition that component carriers are contiguously allocated to a frequency domain and the subcarrier spacing between contiguous component carriers is arranged. FIG. 8 shows another example in which a signal is generated through several IFFT blocks under the condition that component carriers are non-contiguously allocated to a frequency domain.

Figure 9:
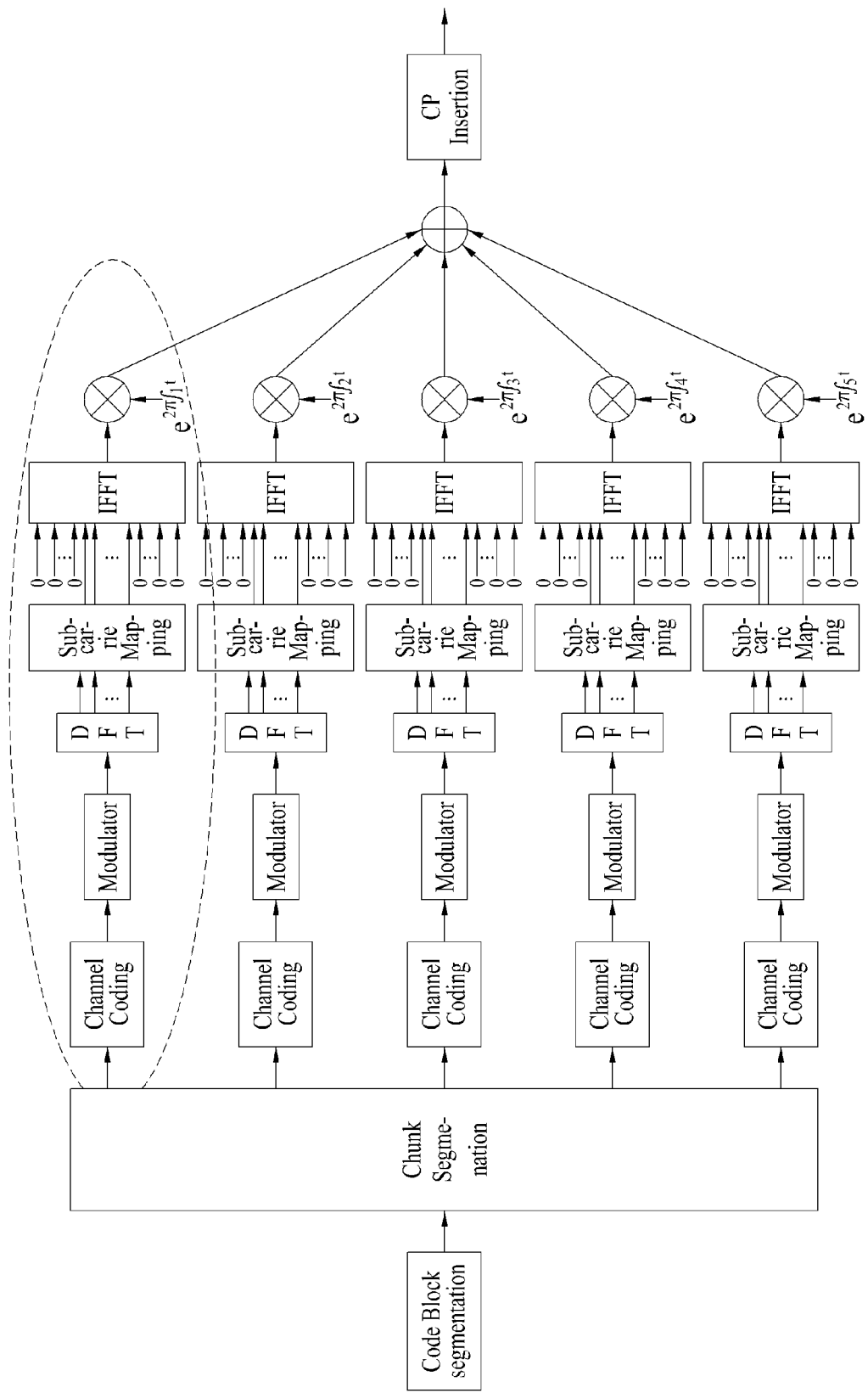
FIG. 9 shows exemplary segmented SC-FDMA signal processing.

FIG. 9 shows exemplary segmented SC-FDMA signal processing.

The segmented SC-FDMA to which the same number of IFFTs as an arbitrary number of DFTs is applied may be considered to be an extended version of the conventional SC-FDMA DFT spread and the IFFT frequency subcarrier mapping structure because the relationship between DFT and IFFT is one-to-one basis. If necessary, the segmented SC-FDMA may also be represented by N×SC-FDMA or N×DFT-s-OFDMA. For convenience of description and better understanding of the present invention, the segmented SC-FDMA, N×SC-FDMA and N×DFT-s-OFDMA may be generically referred to as 'segment SC-FDMA'. Referring to FIG. 9, in order to reduce single carrier characteristics, the segment SC-FDMA groups all the time domain modulation symbols into N groups, such that a DFT process is performed in units of a group.

Figure 10:
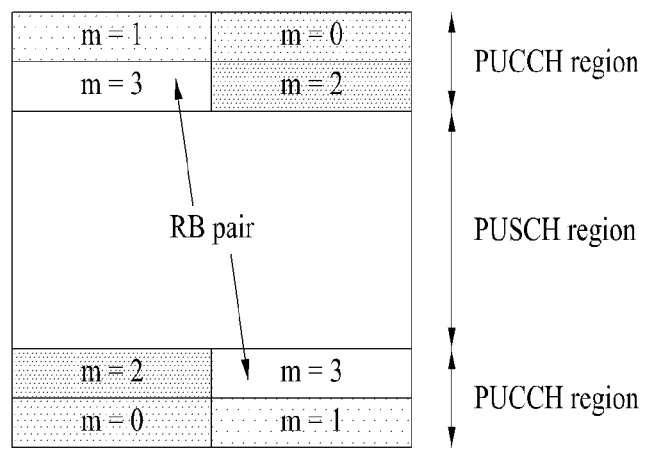
FIG. 10 shows an uplink subframe structure.

FIG. 10 shows an uplink subframe structure.

As shown in FIG. 10, the UL subframe includes a plurality of slots (e.g., two slots). Each slot may include a plurality of SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes a pair of RBs (e.g., m=0, 1, 2, 3) located at both ends of the data region on the frequency axis (specifically, a pair of RBs at frequency mirrored locations) and hops between slots. The UL control information (i.e., UCI) includes HARQ ACK/NACK, Channel Quality Information (CQI), Precoding Matrix Indicator (PMI), and Rank Indication (RI).

Figure 11:
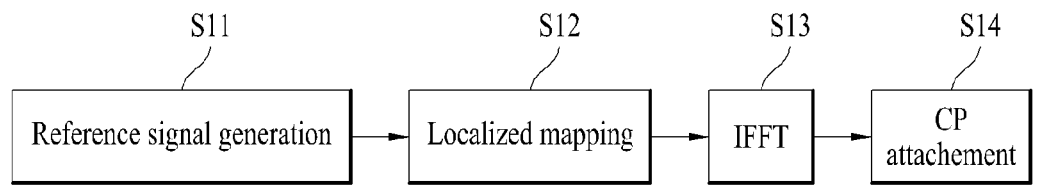
FIG. 11 is a conceptual diagram illustrating a signal processing procedure for transmitting a reference signal (RS) on uplink.

FIG. 11 illustrates a signal processing procedure for transmitting a Reference Signal (RS) in the uplink. As shown in FIG. 11, data is transformed into a frequency domain signal by a DFT precoder and the signal is then transmitted after being subjected to frequency mapping and IFFT. On the other hand, an RS does not pass through the DFT precoder. More specifically, an RS sequence is directly generated in the frequency domain (S11) and is then transmitted after being sequentially subjected to a localized-mapping process (S12), an IFFT process (S13), and a CP attachment process (S14).

The RS sequence $r_{u,v}^{(\alpha)}(n)$ is defined by a cyclic shift $\alpha$ of a base sequence and may be expressed by the following equation 1.

$$r_{u,v}^{(\alpha)}(n) = e^{j\alpha n}\bar{r}_{u,v}(n),\ 0 \le n < M_{sc}^{RS},\quad \text{[Equation 1]}$$

where $M_{sc}^{RS} = mN_{sc}^{RB}$ denotes the length of the RS sequence, $N_{sc}^{RB}$ denotes the size of a resource block represented in subcarriers, and m is $1 \le m \le N_{RB}^{max,UL}$. $N_{RB}^{max,UL}$ denotes a maximum UL transmission band.

A base sequence $\bar{r}_{u,v}(n)$ is divided into several groups. $u \in \{0,1,\ldots,29\}$ denotes group number, and v corresponds to a base sequence number in a corresponding group. Each group includes one base sequence v=0 having a length of $M_{sc}^{RS} = mN_{sc}^{RB}$ ($1 \le m \le 5$) and two base sequences v=0,1 having a length of $M_{sc}^{RS} = mN_{sc}^{RB}$ ($6 \le m \le N_{RB}^{max,UL}$). The sequence group number u and the number v within a corresponding group may be changed with time. The base sequence $\bar{r}_{u,v}(0),\ldots,\bar{r}_{u,v}(M_{sc}^{RS}-1)$ is defined based on a sequence length $M_{sc}^{RS}$.

The base sequence having a length of $3N_{sc}^{RB}$ or more may be defined as follows.

With respect to $M_{sc}^{RS} \ge 3N_{sc}^{RB}$, the base sequence $\bar{r}_{u,v}(0),\ldots,\bar{r}_{u,v}(M_{sc}^{RS}-1)$ is given by the following equation 2.

$$\bar{r}_{u,v}(n) = x_q(n \bmod N_{ZC}^{RS}),\ 0 \le n < M_{sc}^{RS},\quad \text{[Equation 2]}$$

where a q-th root Zadoff-Chu sequence may be defined by the following equation 3.

$$x_q(m) = e^{-j\frac{\pi q m(m+1)}{N_{ZC}^{RS}}},\ 0 \le m \le N_{ZC}^{RS}-1,\quad \text{[Equation 3]}$$

where q satisfies the following equation 4.

$$q = \lfloor \bar{q}+1/2 \rfloor + v \cdot (-1)^{\lfloor 2\bar{q} \rfloor}$$

$$\bar{q} = N_{ZC}^{RS} \cdot (u+1)/31,\quad \text{[Equation 4]}$$

where the length $N_{ZC}^{RS}$ of the Zadoff-Chue sequence is given by the largest prime number, thus satisfying $N_{ZC}^{RS} < M_{sc}^{RS}$.

A base sequence having a length of less than $3N_{sc}^{RB}$ may be defined as follows. First, for $M_{sc}^{RS}=N_{sc}^{RB}$ and $M_{sc}^{RS}=2N_{sc}^{RB}$, the base sequence is given as shown in Equation 5.

$$\bar{r}_{u,v}(n) = e^{j\phi(n)\pi/4},\ 0 \le n \le M_{sc}^{RS}-1,\quad \text{[Equation 5]}$$

where values $\phi(n)$ for $M_{sc}^{RS}=N_{sc}^{RB}$ and $M_{sc}^{RS}=2N_{sc}^{RB}$ are given by the following Table 1, respectively.

TABLE 1

| u | $\phi(0),\ldots,\phi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −1 | 3 | −3 | 1 | −3 | 3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

TABLE 2

| u | $\phi(0),\ldots,\phi(23)$ | | | | | | | | | | | | | | | | | | | | | | | |
|---|---|---|---|---|---|---|---|---|---|---|---|---|---|---|---|---|---|---|---|---|---|---|---|---|
| 0 | −1 | 3 | 1 | −3 | 3 | −1 | 1 | 3 | −3 | 3 | 1 | 3 | −3 | 3 | 1 | 1 | −1 | 1 | 3 | −3 | 3 | −3 | −1 | −3 |
| 1 | −3 | 3 | −3 | −3 | −3 | 1 | −3 | −3 | 3 | −1 | 1 | 1 | 1 | 3 | 1 | −1 | 3 | −3 | −3 | 1 | 3 | 1 | 1 | −3 |
| 2 | 3 | −1 | 3 | 3 | 1 | 1 | −3 | 3 | 3 | 3 | 3 | 1 | −1 | 3 | −1 | 1 | 1 | −1 | −3 | −1 | −1 | 1 | 3 | 3 |
| 3 | −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| 4 | −1 | −1 | −1 | −3 | −3 | −1 | 1 | 1 | 3 | 3 | −1 | 3 | −1 | 1 | −1 | −3 | 1 | −1 | −3 | −3 | 1 | −3 | −1 | −1 |
| 5 | −3 | 1 | 1 | 3 | −1 | 1 | 3 | 1 | −3 | 1 | −3 | 1 | 1 | −1 | −1 | 3 | −1 | −3 | 3 | −3 | −3 | −3 | 1 | 1 |
| 6 | 1 | 1 | −1 | −1 | 3 | −3 | −3 | 3 | −3 | 1 | −1 | −1 | 1 | −1 | 1 | 1 | −1 | −3 | −1 | 1 | −1 | 3 | −1 | −3 |
| 7 | −3 | 3 | 3 | −1 | −1 | −3 | −1 | 3 | 1 | 3 | 1 | 3 | 1 | 1 | −1 | 3 | 1 | −1 | 1 | 3 | −3 | −1 | −1 | 1 |
| 8 | −3 | 1 | 3 | −3 | 1 | −1 | −3 | 3 | −3 | 3 | −1 | −1 | −1 | −1 | 1 | −3 | −3 | −3 | 1 | −3 | −3 | −3 | 1 | −3 |
| 9 | 1 | 1 | −3 | 3 | 3 | −1 | −3 | −1 | 3 | −3 | 3 | 3 | 3 | −1 | 1 | 1 | −3 | 1 | −1 | 1 | 1 | −3 | 1 | 1 |
| 10 | −1 | 1 | −3 | −3 | 3 | −1 | 3 | −1 | −1 | −3 | −3 | −3 | −1 | −3 | −3 | 1 | −1 | 1 | 3 | 3 | −1 | 1 | −1 | 3 |
| 11 | 1 | 3 | 3 | −3 | −3 | 1 | 3 | 1 | −3 | −3 | −3 | 3 | 3 | −3 | 3 | 3 | −1 | −3 | 3 | −1 | 1 | −3 | 1 | 1 |
| 12 | 1 | 3 | 3 | 1 | 1 | 1 | −1 | −1 | 1 | −3 | 3 | −1 | 1 | 1 | −3 | 3 | 3 | −1 | −3 | 3 | −3 | −1 | −3 | −1 |
| 13 | 3 | −1 | −1 | −1 | −1 | −3 | −1 | 3 | 3 | 1 | −1 | 1 | 3 | 3 | 3 | −1 | 1 | 1 | −3 | 1 | 3 | −1 | −3 | 3 |
| 14 | −3 | −3 | 3 | 1 | 3 | 1 | −3 | 3 | 1 | 3 | 1 | 1 | 3 | 3 | −1 | −1 | −3 | 1 | −3 | −1 | 3 | 1 | 1 | 3 |
| 15 | −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |

TABLE 2-continued

| u | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 16 | −1 | −3 | 3 | −1 | −1 | −1 | −1 | 1 | 1 | −3 | 3 | 1 | 3 | 3 | 1 | −1 | 1 | −3 | 1 | −3 | 1 | 1 | −3 | −1 |
| 17 | 1 | 3 | −1 | 3 | 3 | −1 | −3 | 1 | −1 | −3 | 3 | 3 | 3 | −1 | 1 | 1 | 3 | −1 | −3 | −1 | 3 | −1 | −1 | −1 |
| 18 | 1 | 1 | 1 | 1 | 1 | −1 | 3 | −1 | −3 | 1 | 1 | 3 | −3 | 1 | −3 | −1 | 1 | 1 | −3 | −3 | 3 | 1 | 1 | −3 |
| 19 | 1 | 3 | 3 | 1 | −1 | −3 | 3 | −1 | 3 | 3 | 3 | −3 | 1 | −1 | 1 | −1 | −3 | −1 | 1 | 3 | −1 | 3 | −3 | −3 |
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | −1 | 3 | 1 | −3 | −1 | 1 | −1 | 1 | −1 | −1 | 3 | 3 | −3 | −1 | 1 | −3 |
| 22 | −3 | −1 | −3 | 3 | 1 | −1 | −3 | −1 | −3 | −3 | 3 | −3 | 3 | −3 | −1 | 1 | 3 | 1 | −3 | 1 | 3 | 3 | −1 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | −3 | 3 | −3 | −1 | −1 | 3 | −1 | 3 | −1 | −1 | 1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 1 | −3 | 1 | 3 | −3 | 1 | 1 | −3 | −3 | −1 | −1 |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

RS hopping is described below.

The sequence group number u in a slot $n_s$ may be defined as shown in the following equation 6 by a group hopping pattern $f_{gh}(n_s)$ and a sequence shift pattern $f_{ss}$.

$$u = (f_{gh}(n_s) + f_{ss}) \bmod 30,\quad \text{[Equation 6]}$$

where mod denotes a modulo operation.

17 different hopping patterns and 30 different sequence shift patterns are present. Sequence group hopping may be enabled or disabled by a parameter for activating group hopping provided by a higher layer.

Although the PUCCH and the PUSCH have the same hopping pattern, the PUCCH and the PUSCH may have different sequence shift patterns.

The group hopping pattern $f_{gh}(n_s)$ is the same for the PUSCH and the PUCCH and is given by the following equation 7.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled,} \end{cases} \quad \text{[Equation 7]}$$

where c(i) denotes a pseudo-random sequence and a pseudo-random sequence generator may be initialized by $$c_{init} = \left\lfloor \frac{N_{ID}^{cell}}{30} \right\rfloor$$

at the start of each radio frame.

The definition of the sequence shift pattern $f_{ss}$ varies between the PUCCH and the PUSCH.

The sequence shift pattern $f_{ss}^{PUCCH}$ of the PUCCH is $f_{ss}^{PUCCH} = N_{ID}^{cell} \bmod 30$ and the sequence shift pattern $f_{ss}^{PUSCH}$ of the PUSCH is $f_{ss}^{PUSCH} = (f_{ss}^{PUCCH} + \Delta_{ss}) \bmod 30$. $\Delta_{ss} \in \{0, 1, \ldots, 29\}$ is configured by a higher layer.

The following is a description of sequence hopping.

Sequence hopping is applied only to an RS having a length of $M_{sc}^{RS} \geq 6N_{sc}^{RB}$.

For an RS having a length of $M_{sc}^{RS} < 6N_{sc}^{RB}$, a base sequence number v within a base sequence group is v=0.

For an RS having a length of $M_{sc}^{RS} \geq 6N_{sc}^{RB}$, a base sequence $n_s$ number v within a base sequence group in a slot $n_s$ is given by the following equation 8.

$$v = \begin{cases} c(n_s) & \text{if group hopping is disabled and} \\ & \text{sequence hopping is enabled} \\ 0 & \text{otherwise,} \end{cases} \quad \text{[Equation 8]}$$

where c(i) denotes a pseudo-random sequence and a parameter for enabling sequence hopping provided by a higher layer determines whether or not sequence hopping is possible. The pseudo-random sequence generator may be initialized as $$c_{init} = \left\lfloor \frac{N_{ID}^{cell}}{30} \right\rfloor \cdot 2^5 + f_{ss}^{PUSCH}$$

at the start of a radio frame.

An RS for a PUSCH is determined in the following manner.

The RS sequence $r^{PUSCH}(\cdot)$ for the PUCCH is defined as $r^{PUSCH}(m \cdot M_{sc}^{RS} + n) = r_{u,v}^{(\alpha)}(n)$. Here, m and n satisfy $$m = 0, 1$$
$$n = 0, \ldots, M_{sc}^{RS} - 1$$

and satisfy $M_{sc}^{RS} = M_{sc}^{PUSCH}$.

A cyclic shift in one slot is given by $\alpha = 2\pi n_{cs}/12$ together with $n_{cs} = (n_{DMRS}^{(1)} + n_{DMRS}^{(2)} + n_{PRS}(n_s)) \bmod 12$.

Here, $n_{DMRS}^{(1)}$ is a broadcast value, $n_{DMRS}^{(2)}$ is given by UL scheduling allocation, and $n_{PRS}(n_s)$ is a cell-specific cyclic shift value. $n_{PRS}(n_s)$ varies according to a slot number $n_s$, and is given by $n_{PRS}(n_s) = \sum_{i=0}^{7} c(8 \cdot n_s + i) \cdot 2^i$.

c(i) is a pseudo-random sequence and c(i) is also a cell-specific value. The pseudo-random sequence generator may be initialized as $$c_{init} = \left\lfloor \frac{N_{ID}^{cell}}{30} \right\rfloor \cdot 2^5 + f_{ss}^{PUSCH}$$

at the start of a radio frame.

Table 3 shows a cyclic shift field and $n_{DMRS}^{(2)}$ at a downlink control information (DCI) format 0.

TABLE 3

| Cyclic shift field at DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for a UL RS at a PUSCH is as follows.

A sequence is multiplied by an amplitude scaling factor $\beta_{PUSCH}$ and is mapped to the same physical resource block (PRB) set used for the corresponding PUSCH within the sequence that starts at $r^{PUSCH}(0)$. When the sequence is mapped to a resource element (k,l) (l=3 for a normal CP and l=2 for an extended CP) within a subframe, the order of k is first increased and the slot number is then increased.

In summary, a ZC sequence is used along with cyclic extension if the length is greater than or equal to $3N_{sc}^{RB}$ and a computer-generated sequence is used if the length is less than $3N_{sc}^{RB}$. The cyclic shift is determined according to a cell-specific cyclic shift, a UE-specific cyclic shift, a hopping pattern, and the like.

Figure 12A:
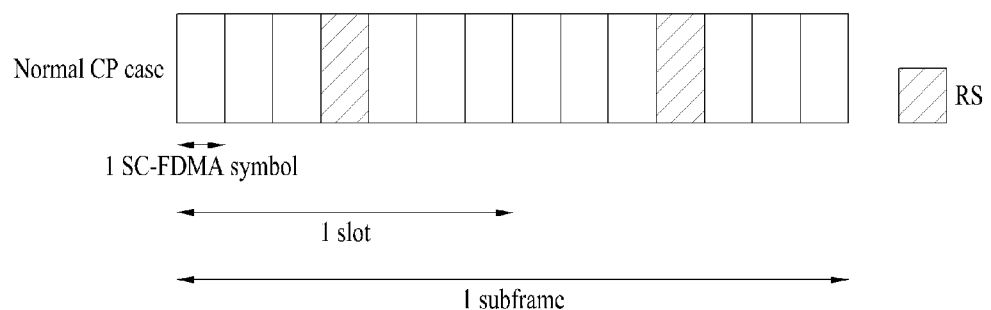
FIG. 12 shows demodulation reference signal (DMRS) structures for a physical uplink shared channel (PUSCH).
Figure 12B:
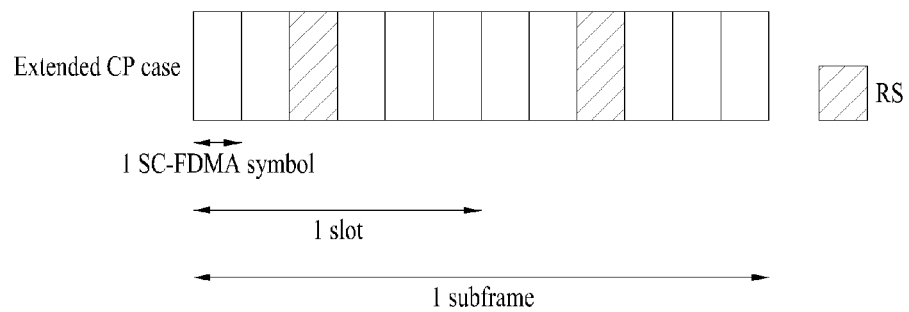

FIG. 12A illustrates the structure of a demodulation reference signal (DMRS) for a PUSCH in the case of normal CP and FIG. 12B illustrates the structure of a DMRS for a PUSCH in the case of extended CP. In the structure of FIG. 12A, a DMRS is transmitted through fourth and eleventh SC-FDMA symbols and, in the structure of FIG. 12B, a DMRS is transmitted through third and ninth SC-FDMA symbols.

FIGS. 13 to 16 illustrate a slot level structure of a PUCCH format. The PUCCH includes the following formats in order to transmit control information.

(1) Format 1: Used for on-off keying (OOK) modulation and scheduling request (SR)

(2) Format 1a and Format 1b: Used for ACK/NACK transmission
  1) Format 1a: BPSK ACK/NACK for one codeword
  2) Format 1b: QPSK ACK/NACK for two codewords (3) Format 2: Used for QPSK modulation and CQI transmission (4) Format 2a and Format 2b: Used for CQI and ACK/NACK simultaneous transmission.

Table 4 shows a modulation scheme and the number of bits per subframe according to PUCCH format. Table 5 shows the number of RSs per slot according to PUCCH format. Table 6 shows SC-FDMA symbol locations of an RS according to PUCCH format. In Table 4, the PUCCH formats 2a and 2b correspond to the case of normal CP.

TABLE 4

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| PUCCH format | SC-FDMA symbol location of RS | |
|---|---|---|
| | Normal CP | Extended CP |
| 1, 1a, 1b | 2, 3, 4 | 2, 3 |
| 2, 2a, 2b | 1, 5 | 3 |

Figure 13:
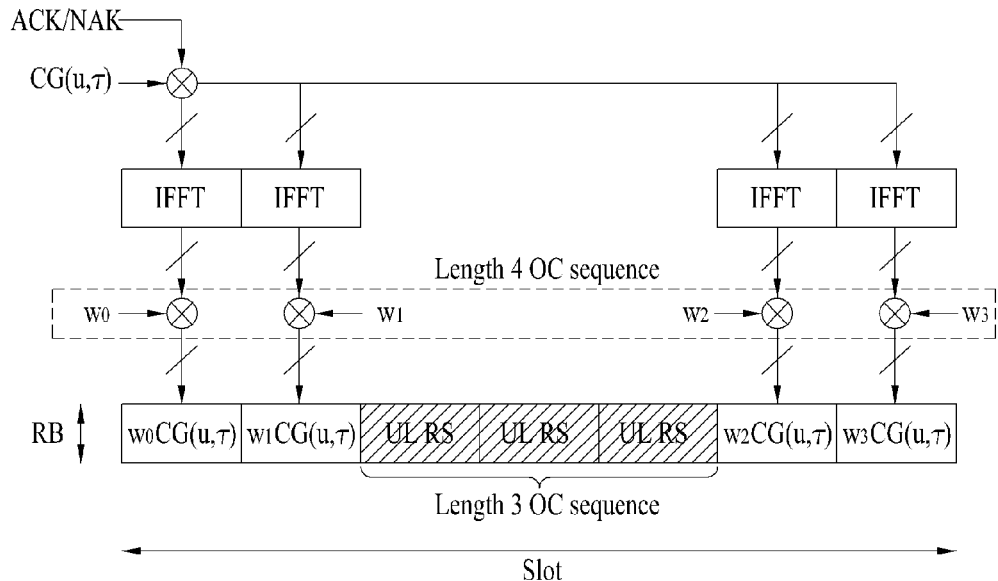
FIGS. 13 and 14 exemplarily show slot level structures of PUCCH formats 1a and 1b.
Figure 14:
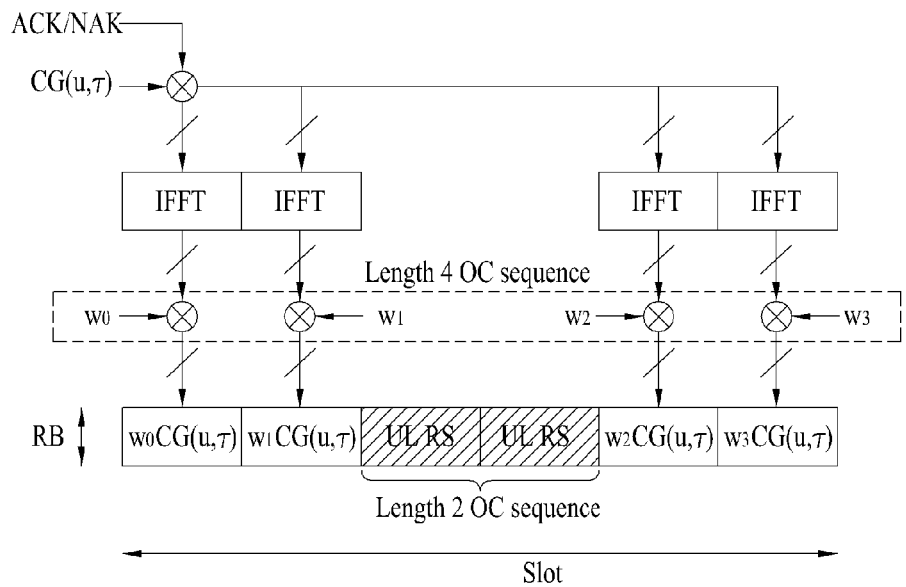

FIG. 13 shows a PUCCH format 1a and 1b structure in the case of a normal CP. FIG. 14 shows a PUCCH format 1a and 1b structure in the case of an extended CP. In the PUCCH format 1a and 1b structure, the same control information is repeated in each slot within a subframe. UEs transmit ACK/NACK signals through different resources that include orthogonal covers or orthogonal cover codes (OCs or OCCs) and different cyclic shifts (i.e., different frequency domain codes) of a Computer-Generated Constant Amplitude Zero Auto Correlation (CG-CAZAC) sequence. For example, the OCs may include orthogonal Walsh/DFT codes. When the number of CSs is 6 and the number of OCs is 3, a total of 18 UEs may be multiplexed in the same Physical Resource Block (PRB) based on a single antenna. Orthogonal sequences w0, w1, w2, and w3 may be applied to an arbitrary time domain (after FFT modulation) or an arbitrary frequency domain (before FFT modulation).

For SR and persistent scheduling, ACK/NACK resources composed of CSs, OCs and PRBs may be assigned to UEs through Radio Resource Control (RRC). For dynamic ACK/NACK and non-persistent scheduling, ACK/NACK resources may be implicitly assigned to the UE using the lowest CCE index of a PDCCH corresponding to the PDSCH.

Figure 15:
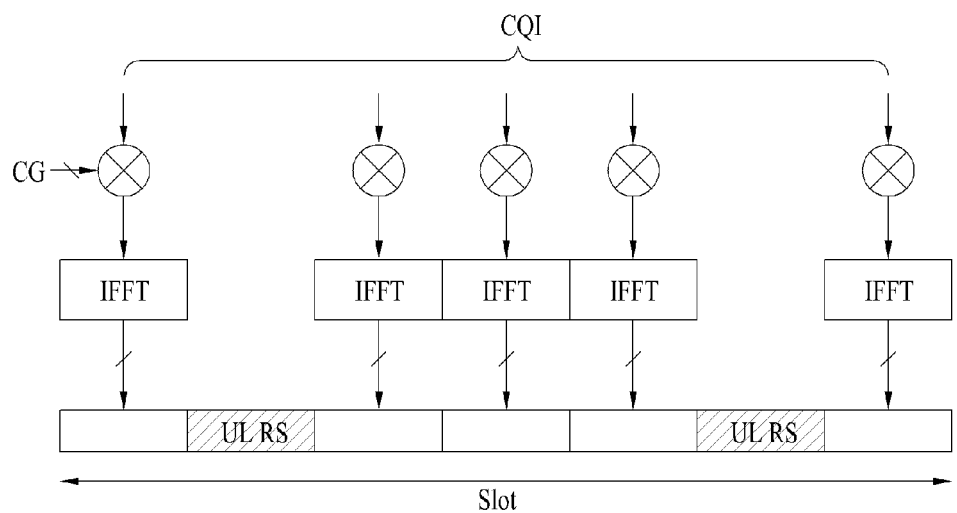
FIGS. 15 and 16 exemplarily show slot level structures of PUCCH formats 2/2a/2b.
Figure 16:
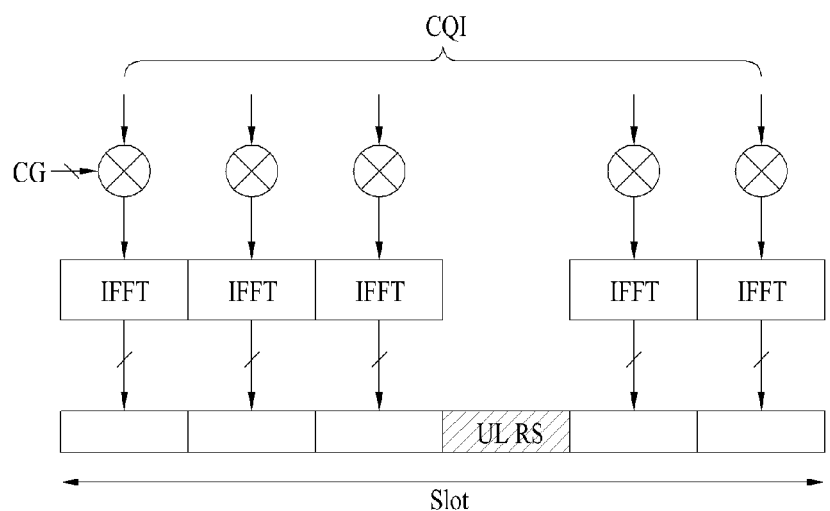

FIG. 15 shows a PUCCH format 2/2a/2b structure in the case of the normal CP. FIG. 16 shows a PUCCH format 2/2a/2b structure in the case of the extended CP. As shown in FIGS. 15 and 16, one subframe includes 10 QPSK data symbols in addition to an RS symbol in the normal CP case. Each QPSK symbol is spread in the frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in PUCCH formats 1/1a/1b and 2/2a/2b, a plurality of UEs may be multiplexed by CS+OC+PRB and CS+PRB.

Length-4 and length-3 orthogonal sequences (OCs) for PUCCH formats 1/1a/1b are shown in the following Tables 7 and 8.

TABLE 7

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The orthogonal sequences (OCs) for the RS in the PUCCH formats 1/1a/1b are shown in Table 9.

TABLE 9

| | 1a and 1b | |
|---|---|---|
| Sequence index $\bar{n}_{oc}(n_s)$ | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH formats 1a and 1b when $\Delta_{shift}^{PUCCH}=2$.

Figure 18:
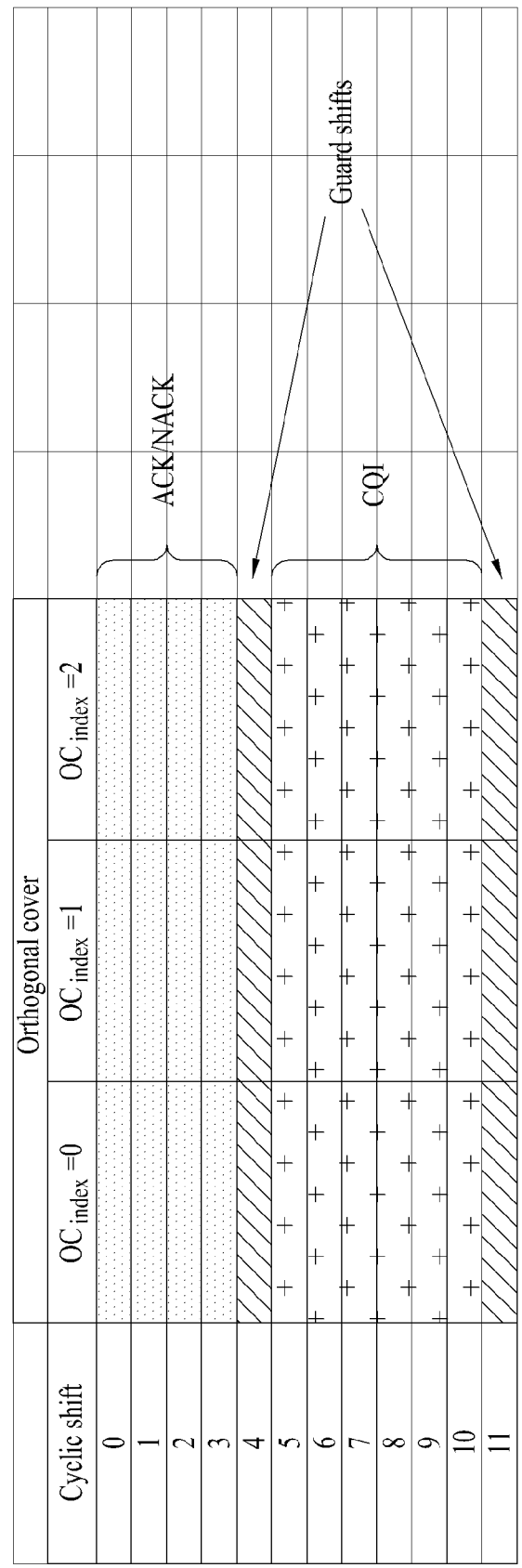
FIG. 18 is a diagram showing channelization of a structure in which PUCCH formats 1/1a/1b and PUCCH formats 2/2a/2b are mixed within the same PRB.

FIG. 18 illustrates channelization of a structure in which PUCCH formats 1/1a/1b and PUCCH formats 2/2a/2b are mixed within the same PRB.

CS (Cyclic Shift) hopping and OC (Orthogonal Cover) remapping may be applied as follows.

(1) Symbol-based cell-specific CS hopping for inter-cell interference randomization
(2) Slot level CS/OC remapping
  1) For inter-cell interference randomization
  2) Slot-based access for mapping between ACK/NACK channels and resources (k)

A resource $n_r$ for PUCCH formats 1/1a/1b includes the following combination.

(1) CS (=DFT OC in a symbol level) ($n_{cs}$)
(2) OC (OC in a slot level) ($n_{oc}$)
(3) Frequency RB ($n_{rb}$)

When indices representing the CS, the OC and the RB are $n_{cs}$, $n_{oc}$, and $n_{rb}$, respectively, a representative index $n_r$ includes $n_{cs}$, $n_{oc}$ and $n_{rb}$. That is, $n_r=(n_{cs}, n_{oc}, n_{rb})$.

A CQI, a PMI, an RI, and a combination of a CQI and an ACK/NACK may be transmitted through PUCCH formats 2/2a /2b. Here, Reed Muller (RM) channel coding may be applied.

For example, in the LTE system, channel coding for a UL CQI is described as follows. A bit stream $a_0, a_1, a_2, a_3, \ldots, a_{A-1}$ is channel-coded using a (20, A) RM code. Table 10 shows a base sequence for the (20, A) code. $a_0$ and $a_{A-1}$ represent a Most Significant Bit (MSB) and a Least Significant Bit (LSB), respectively. In the extended CP case, the maximum number of information bits is 11, except when the CQI and the ACK/NACK are simultaneously transmitted. After the bit stream is coded into 20 bits using the RM code, QPSK modulation may be applied to the coded bits. Before QPSK modulation, the coded bits may be scrambled.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 0 | 1 | 0 | 1 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by Equation 9.

$$b_i = \sum_{n=0}^{A-1} (a_n \cdot M_{i,n}) \mod 2, \quad [\text{Equation 9}]$$

where $i = 0, 1, 2, \ldots, B-1$.

Table 11 shows an uplink control information (UCI) field for broadband reporting (single antenna port, transmit diversity or open loop spatial multiplexing PDSCH) CQI feedback.

TABLE 11

| Field | Bandwidth |
|---|---|
| Wideband CQI | 4 5 |

Table 12 shows a UCI field for wideband CQI and PMI feedback. The field reports closed loop spatial multiplexing PDSCH transmission.

TABLE 12

| | Bandwidth | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 13 shows a UCI field for RI feedback for wideband reporting.

TABLE 13

| | Bit widths | | |
|---|---|---|---|
| | | 4 antenna ports | |
| Field | 2 antenna ports | Up to two layers | Up to four layers |
| RI (Rank Indication) | 1 | 1 | 2 |

Figure 19:
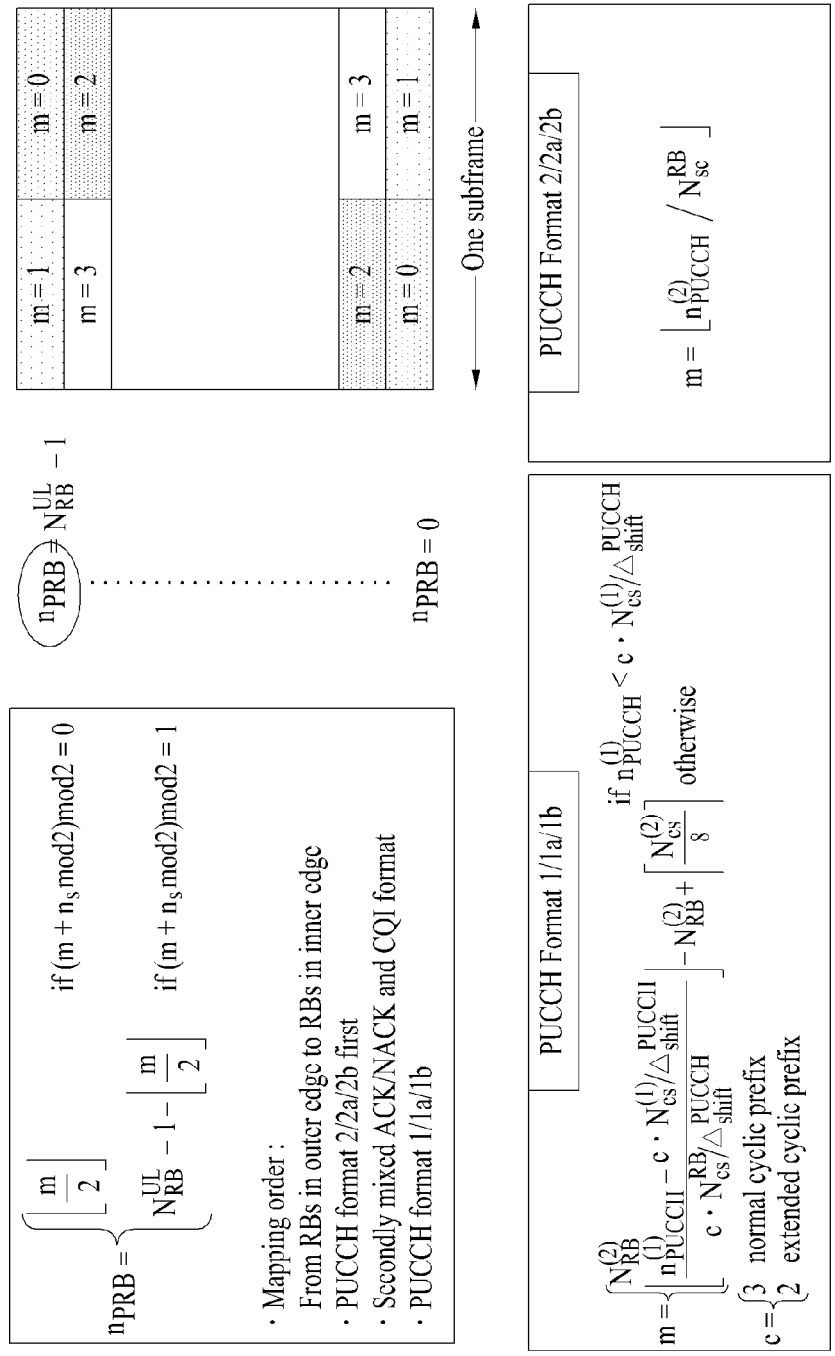
FIG. 19 is a diagram showing allocation of a physical resource allocation (PRB) used to transmit a PUCCH.

FIG. 19 shows PRB allocation. As shown in FIG. 19, the PRB may be used for PUCCH transmission in slot $n_s$.

The term "multi-carrier system" or "carrier aggregation system" refers to a system for aggregating and utilizing a plurality of carriers having a bandwidth smaller than a target bandwidth for broadband support. When a plurality of carriers having a bandwidth smaller than a target bandwidth is aggregated, the bandwidth of the aggregated carriers may be limited to a bandwidth used in the existing system for backward compatibility with the existing system. For example, the existing LTE system may support bandwidths of 1.4, 3, 5, 10, 15 and 20 MHz and an LTE-Advanced (LTE-A) system evolved from the LTE system may support a bandwidth greater than 20 MHz using only the bandwidths supported by the LTE system. Alternatively, regardless of the bandwidths used in the existing system, a new bandwidth may be defined so as to support carrier aggregation. The term "multi-carrier" may be used interchangeably with the terms "carrier aggregation" and "bandwidth aggregation". The term "carrier aggregation" may refer to both contiguous carrier aggregation and non-contiguous carrier aggregation.

Figure 20:
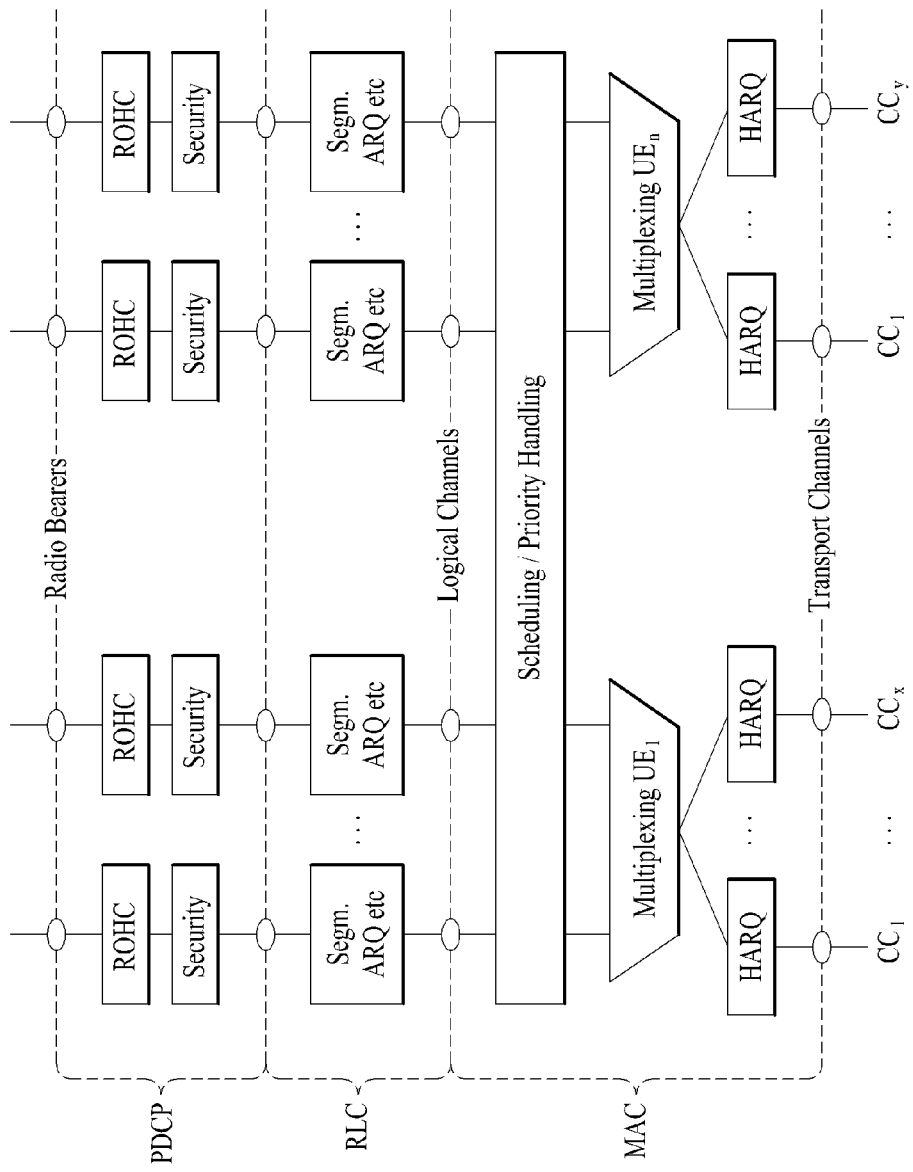
FIG. 20 is a conceptual diagram of management of a downlink component carrier (DL CC) in a base station (BS).
Figure 21:
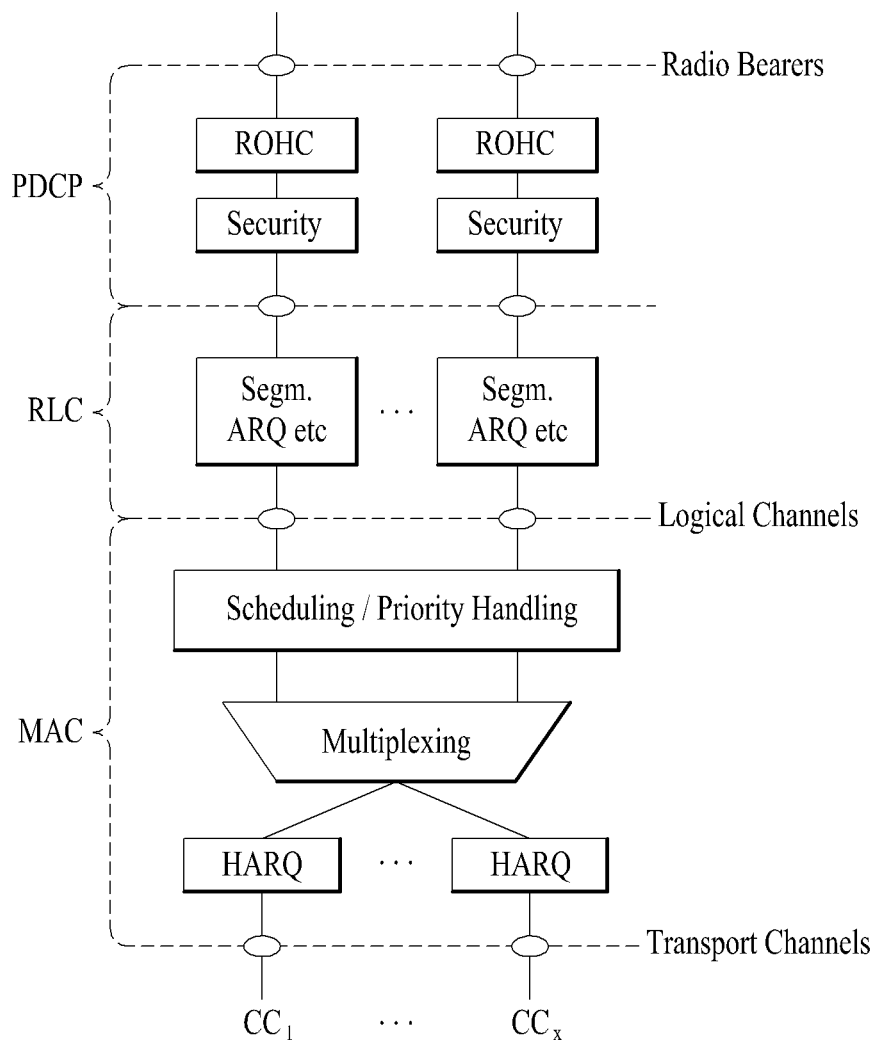
FIG. 21 is a conceptual diagram of management of an uplink component carrier (UL CC) in a user equipment (UE).

FIG. 20 is a conceptual diagram illustrating management of downlink component carriers (DL CCs) in a base station (BS) and FIG. 21 is a conceptual diagram illustrating management of uplink component carriers (UL CCs) in a user equipment (UE). For ease of explanation, the higher layer is simply described as a MAC (or a MAC entity) in the following description of FIGS. 20 and 21.

Figure 22:
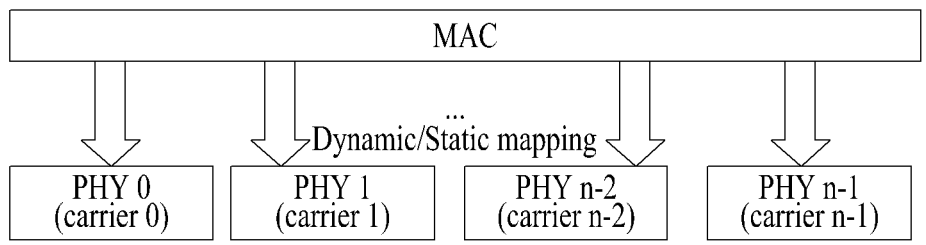
FIG. 22 is a conceptual diagram of the case where one MAC layer manages multiple carriers in a BS.
Figure 23:
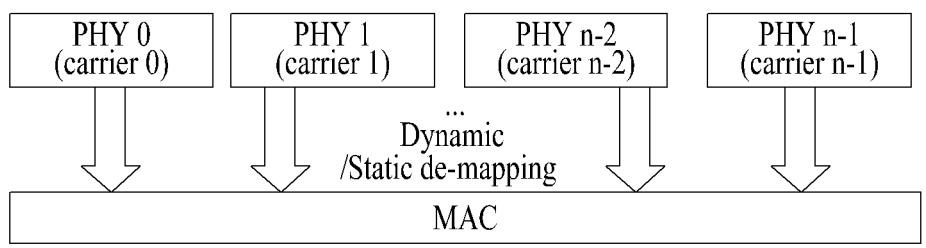
FIG. 23 is a conceptual diagram of the case where one MAC layer manages multiple carriers in a UE.

FIG. 22 is a conceptual diagram illustrating management of multiple carriers by one MAC entity in a BS. FIG. 23 is a conceptual diagram illustrating management of multiple carriers by one MAC entity in a UE.

As shown in FIGS. 22 and 23, one MAC manages and operates one or more frequency carriers to perform transmission and reception. Frequency carriers managed by one MAC need not be contiguous and as such they are more flexible in terms of resource management. In FIGS. 22 and 23, it is assumed that one PHY (or PHY entity) corresponds to one component carrier (CC) for ease of explanation. One PHY does not always indicate an independent radio frequency (RF) device. Although one independent RF device generally corresponds to one PHY, the present invention is not limited thereto and one RF device may include a plurality of PHYs.

Figure 24:
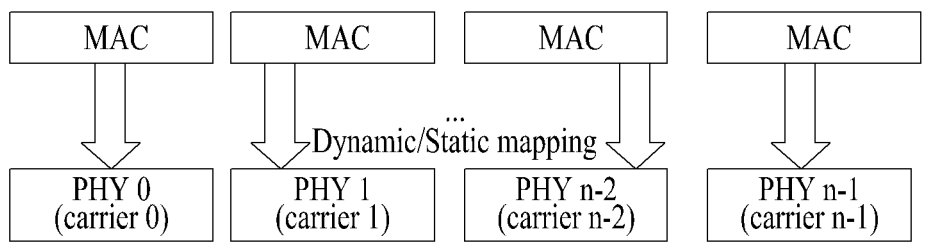
FIG. 24 is a conceptual diagram of the case where one MAC layer manages multiple carriers in a BS.
Figure 25:
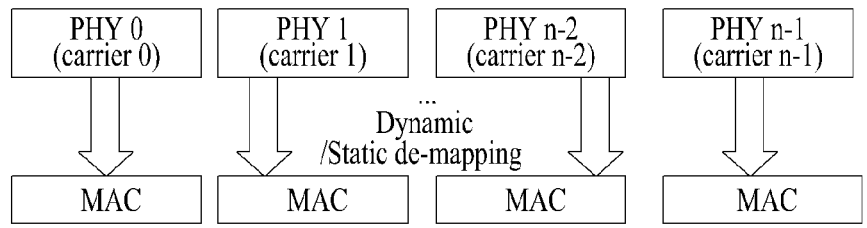
FIG. 25 is a conceptual diagram of the case where a plurality of MAC layers manages multiple carriers in a UE.
Figure 26:
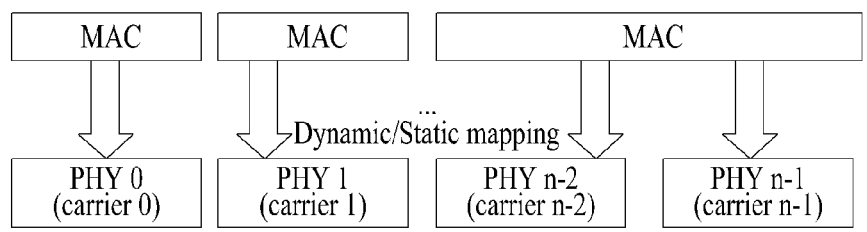
FIG. 26 is a conceptual diagram of the case where a plurality of MAC layers manages multiple carriers in a BS according to one embodiment of the present invention.
Figure 27:
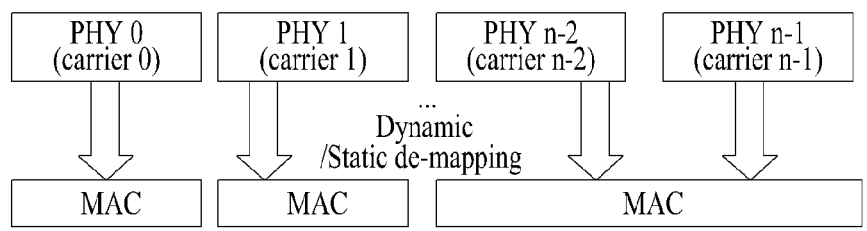
FIG. 27 is a conceptual diagram of the case where a plurality of MAC layers manages multiple carriers from the viewpoint of UE reception according to another embodiment of the present invention.

FIG. 24 is a conceptual diagram illustrating management of multiple carriers by a plurality of MAC entities in a BS. FIG. 25 is a conceptual diagram illustrating management of multiple carriers by a plurality of MAC entities in a UE. FIG. 26 illustrates another scheme of management of multiple carriers by a plurality of MAC entities in a BS. FIG. 27 illustrates another scheme of management of multiple carriers by a plurality of MAC entities in a UE.

Unlike the structures of FIGS. 22 and 23, a number of carriers may be controlled by a number of MAC entities rather than by one MAC as shown in FIGS. 24 to 27.

As shown in FIGS. 24 and 25, carriers may be controlled by MACs on a one to one basis. As shown in FIGS. 26 and 27, some carriers may be controlled by MACs on a one to one basis and one or more remaining carriers may be controlled by one MAC.

The above-mentioned system includes a plurality of carriers (i.e., 1 to N carriers) and carriers may be used so as to be contiguous or non-contiguous to each other. This scheme may be equally applied to UL and DL. The TDD system is constructed so as to manage N carriers, each including downlink and uplink transmission, and the FDD system is constructed such that multiple carriers are applied to each of uplink and downlink. The FDD system may also support asymmetrical carrier aggregation in which the numbers of carriers aggregated in uplink and downlink and/or the bandwidths of carriers in uplink and downlink are different.

When the number of component carriers (CCs) aggregated in uplink (UL) is identical to the number of CCs aggregated in downlink (DL), all CCs may be configured so as to be compatible with the conventional system. However, this does not mean that CCs that are configured without taking into consideration such compatibility are excluded from the present invention.

Hereinafter, it is assumed for ease of explanation description that, when a PDCCH is transmitted through DL component carrier #0, a PDSCH corresponding to the PDCCH is transmitted through DL component carrier #0. However, it is apparent that cross-carrier scheduling may be applied such that the PDSCH is transmitted through a different DL component carrier. The term "component carrier" may be replaced with other equivalent terms (e.g., cell).

Figure 28:
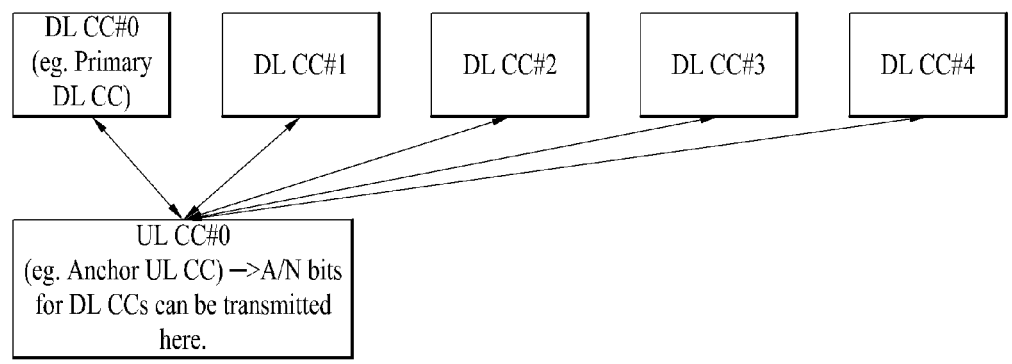
FIG. 28 is a diagram showing asymmetric carrier aggregation (CA) in which a plurality of downlink component carriers (DL CCs) and one uplink CC are linked.

FIG. 28 shows a scenario in which uplink control information (UCI) is transmitted in a radio communication system supporting carrier aggregation (CA). For ease of explanation, it is assumed in this example that the UCI is ACK/NACK (A/N). However, the UCI may include control information such as channel state information (CSI) (e.g., CQI, PMI, RI, etc.) or scheduling request information (e.g., SR, etc.).

FIG. 28 shows asymmetric carrier aggregation in which 5 DL CCs and one UL CC are linked. The illustrated asymmetric carrier aggregation may be set from the viewpoint of UCI transmission. That is, a DL CC-UL CC linkage for UCI and a DL CC-UL CC linkage for data may be set differently. When it is assumed for ease of explanation that one DL CC can carry up to two codewords, at least two ACK/NACK bits are needed. In this case, in order to transmit an ACK/NACK for data received through 5 DL CCs through one UL CC, at least 10 ACK/NACK bits are needed. In order to also support a discontinuous transmission (DTX) state for each DL CC, at least 12 bits ($=5^5=3125=11.61$ bits) are needed for ACK/NACK transmission. The conventional PUCCH format 1a/1b structure cannot transmit such extended ACK/NACK information since the conventional PUCCH format 1a/1b structure can transmit up to 2 ACK/NACK bits. Although carrier aggregation has been illustrated as a cause of an increase in the amount of UCI information, the amount of UCI information may also be increased due to an increase in the number of antennas and the presence of a backhaul subframe in a TDD system or a relay system. Similar to the case of ACK/NACK, the amount of control information that should be transmitted is increased even when control information associated with a plurality of DL CCs is transmitted through one UL CC. For example, UCI payload may be increased when there is a need to transmit a CQI/PMI/RI for a plurality of DL CCs. DL CC may also be referred to as DL Cell, and UL CC may also be referred to as UL Cell. In addition, the anchor DL CC may also be referred to as DL PCell, and the anchor UL CC may also be referred to as UL PCell.

A DL primary CC may be defined as a DL CC linked with a UL primary CC. Here, linkage includes implicit and explicit linkage. In LTE, one DL CC and one UL CC are uniquely paired. For example, a DL CC that is linked with a UL primary CC by LTE pairing may be referred to as a DL primary CC. This may be regarded as implicit linkage. Explicit linkage indicates that a network configures the linkage in advance and may be signaled by RRC or the like. In explicit linkage, a DL CC that is paired with a UL primary CC may be referred to as a primary DL CC. A UL primary (or anchor) CC may be a UL CC in which a PUCCH is transmitted. Alternatively, the UL primary CC may be a UL CC in which UCI is transmitted through a PUCCH or a PUSCH. The DL primary CC may also be configured through higher layer signaling. The DL primary CC may be a DL CC in which a UE performs initial access. DL CCs other than the DL primary CC may be referred to as DL secondary CCs. Similarly, UL CCs other than the UL primary CC may be referred to as UL secondary CCs.

DL-UL may correspond only to FDD. DL-UL pairing may not be defined for TDD since TDD uses the same frequency. In addition, a DL-UL linkage may be determined from a UL linkage through UL E-UTRA Absolute Radio Frequency Channel Number (EARFCN) of SIB2. For example, the DL-UL linkage may be acquired through SIB2 decoding when initial access is performed and may be acquired through RRC signaling otherwise. Accordingly, only the SIB2 linkage may be present and other DL-UL pairing may not be defined. For example, in the 5DL:1UL structure of FIG. 28, DL CC #0 and UL CC #0 may be in an SIB2 linkage relation with each other and other DL CCs may be in an SIB2 linkage relation with other UL CCs which have not been set for the UE.

While some embodiments are focused on asymmetrical carrier aggregation, the present invention can be applied to various carrier aggregation scenarios including symmetrical carrier aggregation.

In order to solve the above-mentioned problems, a method for transmitting increased control information using a plurality of PUCCH resources may be used. For convenience of description, a method for multiplexing ACK/NACK information using a plurality of PUCCH resources will hereinafter be described on the basis of control information denoted by ACK/NACK.

ACK/NACK is one example of control information, and can also be applied to a variety of control channel information such as CSI, PMI, RI, SR, etc. without departing from the scope or spirit of the present invention.

ACK/NACK multiplexing indicates that a plurality of ACK/NACK information is transmitted using at least two PUCCH resources. As examples of ACK/NACK multiplexing using a plurality of PUCCH resources, multi-sequence modulation (MSM) and channel (sequence) selection may be used.

MSM (Multi-Sequence Modulation): The MSM scheme modulates ACK/NACK information, and transmits the modulated result through individual PUCCH resources. For example, provided that 4-bit ACK/NACK information is transmitted, after a first bit sequence (e.g., 2 bits) is modulated (e.g., QPSK-modulated) and a second bit sequence (e.g., 2 bits) is modulated (e.g., QPSK-modulated), a modulation symbol obtained from the first bit sequence is transmitted through a first resource and a modulation symbol obtained from the second bit sequence is transmitted through a second resource, and the first resource and the second resource are simultaneously transmitted (for example, add operation).

Channel (sequence) selection: The channel (sequence) selection scheme selects N resources from among M resources, modulates the corresponding PUCCH resources, and transmits information using the modulated result. That is, ACK/NACK information is indicated by a combination of a selected PUCCH resource and a modulation value applied to the corresponding PUCCH resource. The channel (sequence) selection method can be transmitted using a total of $$2^{M_{order}} \cdot \binom{M}{N}$$

information pieces. In this case, $M_{order}$ is a modulation order, where $$\binom{M}{N}$$

is denoted by $$\binom{M}{N} = \frac{M!}{(M-N)!N!}.$$

For example, when M=2, N=1, and $M_{order}$=2, information regarding a total of 8 states ($=2^2 \times 2$) can be transmitted.

Figure 29:
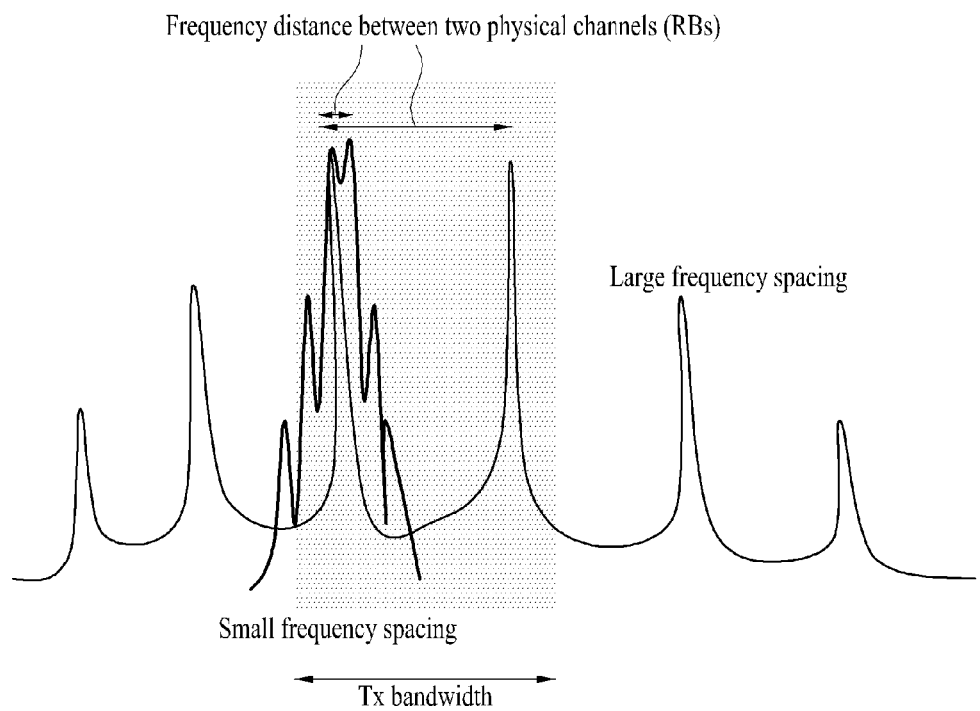
FIG. 29 exemplarily shows Inter-Modulation Distortion (IMD) problems.

FIG. 29 exemplarily shows Inter-Modulation Distortion (IMD) problems encountered when a plurality of physical channels is simultaneously transmitted. FIG. 29 shows OOB emission encountered when a plurality of physical channels (i.e., resource blocks) is transmitted at a band-edge.

Referring to FIG. 29, a solid line exemplarily shows small frequency spacing between RBs, and a dotted line exemplarily shows large frequency spacing between RBs.

In association with two frequencies (f1, f2), a period for generating a harmonic component is denoted by a function of |f1−f2|. That is, as the frequency spacing between two chunks is wider, the positions at which third and fifth harmonic components occur are farther from the transmission band. As the frequency spacing between two chunks is narrower, the positions at which the third/fifth harmonic components occur are closer to the transmission band. A harmonic component located close to a transmission band may cause intra-band interference. A harmonic component located far from the transmission band may cause inter-band interference. The intra-band interference can be solved through power control or resource allocation when a signal is transmitted at a band-edge in the same manner as in a PUCCH. In contrast, the inter-band interference may cause serious problems when a contiguous band is a security band (e.g., Band13).

Embodiment:Transmission of Control Information Using a Plurality of PUCCH Resources A method for efficiently allocating resources when control information is transmitted using a plurality of PUCCH resources will hereinafter be described in detail. In addition, this embodiment provides a resource allocation method for solving the IMD problem shown in FIG. 29. For convenience of description, while the embodiment of the present invention is exemplarily focused on MSM, it should be noted that the scope or spirit of the present invention is not limited thereto.

Figure 30:
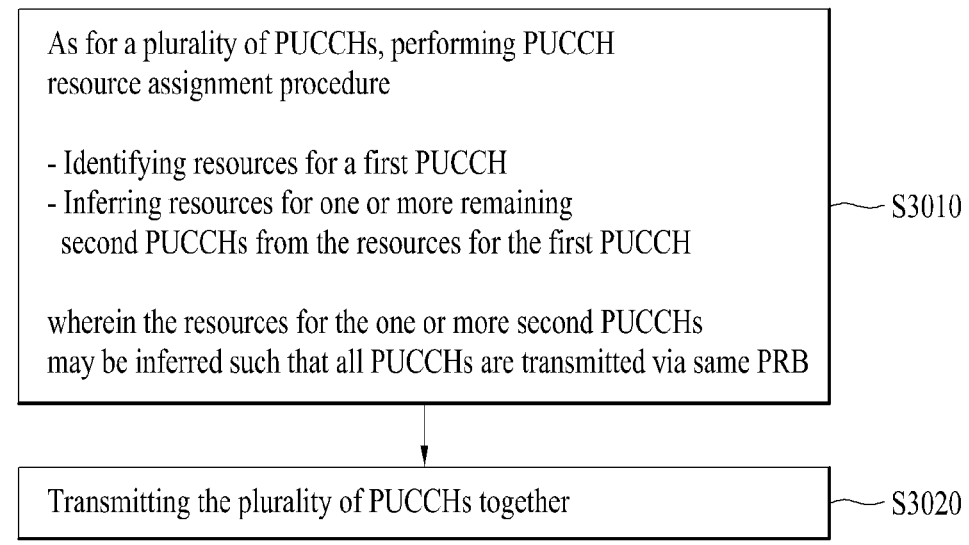
FIG. 30 is a conceptual diagram illustrating a method for transmitting control information using a plurality of PUCCH resources according to one embodiment of the present invention.

FIG. 30 is a conceptual diagram illustrating a method for transmitting control information using a plurality of PUCCH resources according to one embodiment of the present invention.

Referring to FIG. 30, a user equipment (UE) allocates PUCCH resources to transmit a plurality of PUCCHs in step S3010. For convenience of description, it is assumed that M PUCCH resources are utilized. In this case, a first PUCCH resource (for convenience of description, referred to as a first resource) from among M PUCCH resources may be allocated through PDCCH, BCH, RRC, and MAC signaling. For convenience of description, the BCH, RRC, and MAC signaling are generically called higher layer signaling. In contrast, the remaining PUCCH resources (for convenience of description, referred to as a second resource) from among M PUCCH resources can be inferred from a reference PUCCH resource. Each of the first resource index and the second resource index (i.e., PUCCH resource index) may be a cyclic shift (CS) index ($n_{CS}$), an orthogonal cover (OC) index ($n_{OC}$) or a PRB index ($n_{PRB}$), or may be a representative logical index of a combination of the CS index ($n_{CS}$), the OC index ($n_{OC}$), and the PRB index ($n_{PRB}$).

For example, the first resource and the second resource may be given as follows.

The first resource index is given through higher layer signaling (preferably, RRC signaling), and the second resource index can be inferred from the first resource index.

The first resource index candidate is given through higher layer signaling (preferably, RRC signaling), and a first resource index to be actually used can be dynamically given through physical layer signaling (e.g., PDCCH). Thereafter, the second resource index can be inferred from the first resource index.

The first resource index is established to correspond to the lowest CCE index for transmission of a DL grant PDCCH according to a dynamical ACK/NACK resource allocation rule of the legacy LTE, and the second resource index can be inferred from the first resource index. For reference, according to the dynamic ACK/NACK resource allocation rule of the legacy LTE, the PUCCH resource index is determined according to $n_r = n_{cce} + \text{N\_PUCCH}^{(1)}$, where $n_r$ is a PUCCH resource index, $n_{cce}$ is the lowest CCE index constructing a PDCCH, and $\text{N\_PUCCH}^{(1)}$ is a value established by higher layer signaling. The CS index ($n_{CS}$), the OC index ($n_{OC}$) or the PRB index ($n_{PRB}$) can be obtained from the PUCCH resource index ($n_r$).

In another example, the first resource index is established to correspond to the lowest CCE index for transmission of a DL grant PDCCH according to a dynamical ACK/NACK resource allocation rule of the legacy LTE, and the second resource index can be allocated through higher layer signaling.

Preferably, a plurality of PUCCH resources can be allocated to have frequency spacing of zero in step S3010. For example, when the second resource index is inferred from the first resource index, the second resource can be inferred in a manner that all PUCCH resources are present in the same PRB. Since all PUCCH resources are present in the same PRB, the IMD problem can be solved with reference to FIG. 29.

If a PUCCH resource allocation procedure is completed in step S3010, the UE transmits a plurality of control information to the eNode B (or a relay or RN) through the corresponding PUCCH resources in step S3020.

Figure 31:
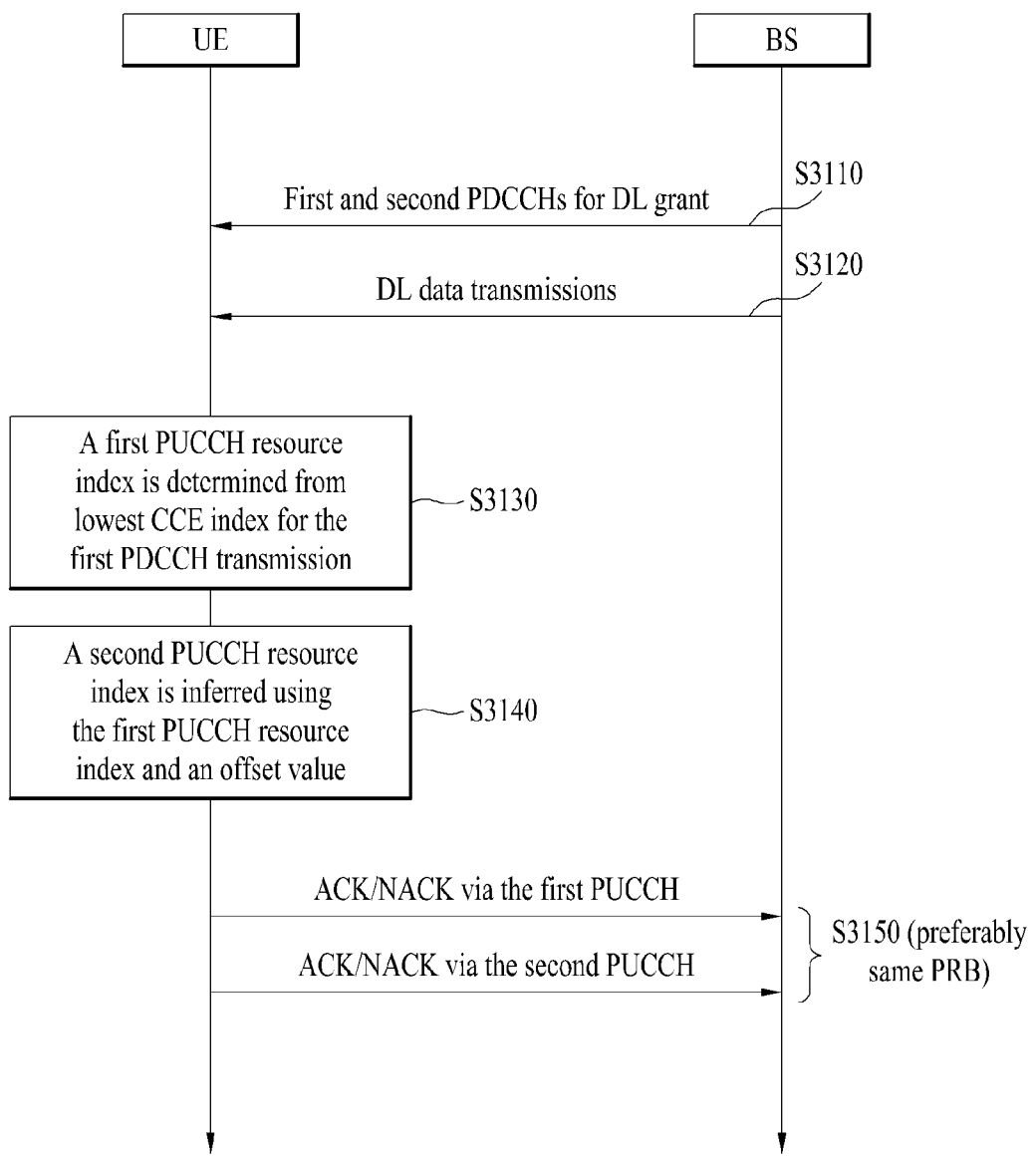
FIG. 31 is a conceptual diagram illustrating a method for transmitting ACK/NACK information through a plurality of PUCCH resources according to one embodiment of the present invention.

FIG. 31 is a conceptual diagram illustrating a method for transmitting ACK/NACK information through a plurality of PUCCH resources according to one embodiment of the present invention. In FIG. 31, the first resource is established to correspond to the lowest CCE index for PDCCH transmission according to the legacy LTE dynamic resource allocation rule, and the second resource index is inferred from the first resource index.

Referring to FIG. 31, a user equipment (UE) receives a plurality of PDCCHs carrying a DL grant from a base station (BS) in step S3110. For convenience of description, it is assumed that the UE receives two PDCCHs. When supporting carrier aggregation (CA), a plurality of PDCCHs can be received through the same or different DL CCs. For example, the first PDCCH can be received through a DL PCC, and the second PDCCH can be received through a DL SCC. Thereafter, the UE receives DL data (i.e., PDSCH) indicated by the first PDCCH and DL data indicated by the second PDCCH. If cross-carrier scheduling is allowed, PDCCH and DL data corresponding thereto can be received through different DL CCs.

Thereafter, the UE generates an ACK/NACK result of DL data received from the BS and performs a PUCCH resource allocation process for feeding back the ACK/NACK result (Steps S3130 and S3140). In more detail, the UE determines the first PUCCH resource index on the basis of the lowest CCE index used to transmit the first PDCCH in step S3130. In contrast, the second PUCCH resource index is inferred from the first PUCCH resource index and the offset value in step S3140. A process for selecting a PDCCH used in step S3130 from among a plurality of PDCCHs can be determined according to a predetermined rule or signaling. For example, a PDCCH for use in step S3130 may be a PDCCH received through a PCC, or may be a first or last PDCCH of a frequency domain.

If the PUCCH resource allocation steps S3130 and S3140 are completed, the UE transmits ACK/NACK information using the corresponding PUCCH resource in step S3150. Preferably, a plurality of PUCCHs can be transmitted through the same PRB. If control information is transmitted using a channel (sequence) selection method, the control information can be transmitted through some PUCCH resources (i.e., a first PUCCH resource or a second PUCCH resource).

Assuming that PUCCH formats 1/1a/1b of the legacy LTE are used, a method for determining the second resource index from the first resource index will hereinafter be described. Resource indices of the LTE PUCCH formats 1/1a/1b can be represented by a combination of the CS value ($n_{cs}$), the OC index ($n_{oc}$), and the PRB index ($n_{PRB}$), and the resource indices can be indexed in the order of CS domain, →OC domain→PRB resource domain.

Assuming that the first resource index is denoted by (a), the second resource index can be determined using the following equation 10. Equation 10 shows an example of cyclic indexing of the second resource.

$$(a+\delta_n) \bmod (N_{CS} \cdot N_{OC} + n_{PRB} \cdot N_{CS} \cdot N_{OC}), \text{ or}$$

$$(a-\delta_n) \bmod (N_{CS} \cdot N_{OC} + n_{PRB} \cdot N_{CS} \cdot N_{OC}) \quad \text{[Equation 10]}$$

In Equation 10, $\delta_n$ is an offset value versus a first resource for the n-th second resource, and may be an arbitrary integer (n=1, 2, . . . ). $N_{CS}$ is the number of cyclic shifts (CSs) available within one PRB. $N_{OC}$ is the number of orthogonal covers (OCs) available within one PRB. $n_{PRB}$ is a PRB index including a currently used resource index.

If $\delta_n$=n, the second resource index can be determined using the following equation 11. The following equation 11 exemplarily shows that the second resource index is sequentially increased on the basis of the first resource index.

$$(a+n) \bmod (N_{CS} \cdot N_{OC} + n_{PRB} \cdot N_{CS} \cdot N_{OC}) \quad \text{[Equation 11]}$$

In Equation 11, a, n, $N_{CS}$ $N_{OC}$, and $n_{PRB}$ are identical to those of Equation 10.

If $\delta_n$=−n, the second resource index can be determined using the following equation 12. Equation 12 exemplarily shows that the second resource index is sequentially reduced on the basis of the first resource index.

$$(a-n) \bmod (N_{CS} \cdot N_{OC} + n_{PRB} \cdot N_{CS} \cdot N_{OC}) \quad \text{[Equation 12]}$$

In Equation 12, a, n, $N_{CS}$, $N_{OC}$, and $n_{PRB}$ are identical to those of Equations 10 and 11.

In another example, $\Delta_{offset} \times n$ may be used instead of 'n' in Equations 10 and 11, where $\Delta_{offset} \times n$ is an integer of 1 or more.

Assuming that PUCCH formats 2/2a/2b of the legacy LTE are used, a method for determining the second resource index from the first resource index will hereinafter be described. The PUCCH formats 2/2a/2b of the legacy LTE have no orthogonal cover (OC) resources, so that the above-mentioned equations 10 to 12 can be modified into the following equations 13 to 15. If it is assumed that the first resource index is set to 'a' in Equations 13 to 15, the second resource index can be cyclically indexed as shown in the following equation 13.

$$(a+\delta_n) \bmod (N_{SC}), \text{ or}$$

$$(a-\delta_n) \bmod (N_{SC}) \quad \text{[Equation 13]}$$

In Equation 13, $\delta_n$ is an offset value versus a first resource for the n-th second resource, and may be an arbitrary integer (n=1, 2, . . . ). $N_{SC}$ is the number (e.g., 12) of subcarriers contained in one PRB.

If $\delta_n$=n, the second resource index can be determined using the following equation 14. The following equation 14 exemplarily shows that the second resource index is sequentially increased on the basis of the first resource index.

$$(a+n) \bmod (N_{SC}) \quad \text{[Equation 14]}$$

In Equation 14, a, n, and $N_{SC}$ are identical to those of the above-mentioned equations.

If $\delta_n$=−n, the second resource index can be determined using the following equation 15. Equation 15 exemplarily shows that the second resource index is sequentially reduced on the basis of the first resource index.

$$(a-n) \bmod (N_{SC}) \quad \text{[Equation 15]}$$

In Equation 15, a, n, and $N_{SC}$ are identical to those of the above-mentioned equations.

In another example, $_{offset} \times n$ may be used instead of 'n' more.

In the above-mentioned example, the first resource index denoted by 'a' can be given by an arbitrary method. For example, "first resource index=a" can be allocated through either higher layer signaling (e.g., BCH, RRC, MAC signaling) or physical layer signaling (e.g., PDCCH). Provided that the legacy LTE dynamic resource allocation rule is used, "first resource index=a" can be established to correspond to the lowest CCE index for PDCCH transmission.

Although the above-mentioned example has disclosed a predetermined value of $\delta_n$, it should be noted that $\delta_n$ may be given through higher layer signaling (e.g., BCH, RRC, MAC signaling) or physical layer signaling (e.g., PDCCH).

Figure 32:
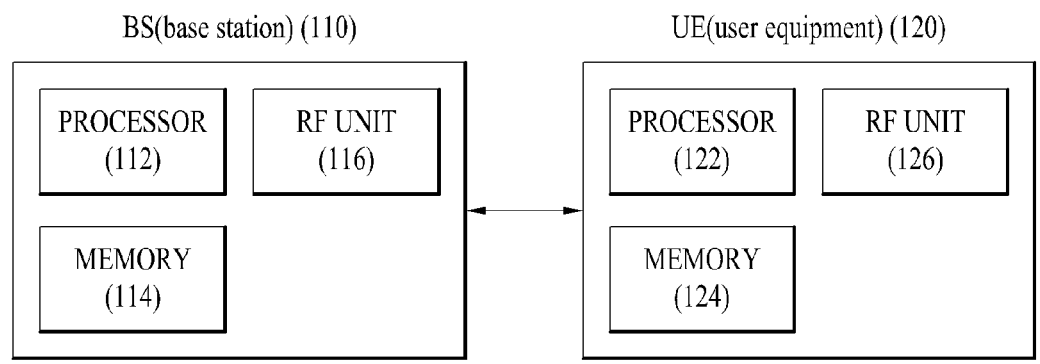
FIG. 32 is a block diagram illustrating a base station (BS) and a user equipment (BS) applicable to embodiments of the present invention.

FIG. 32 is a block diagram illustrating a base station (BS) and a user equipment (BS) applicable to embodiments of the present invention.

Referring to FIG. 32, the wireless communication system includes a base station (BS) 110 and a UE 120. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the eNB (or BS) as the case may be. In other words, it will be apparent that various operations performed for communication with the UE in the network which includes a plurality of network nodes along with the eNB (or BS) can be performed by the BS or network nodes other than the eNB (or BS). The term eNB (or BS) may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

[Industrial Applicability]

Exemplary embodiments of the present invention can be applied to a user equipment (UE), a base station (BS), and other devices. In more detail, the present invention can be applied to a method and apparatus for transmitting uplink control information.

The invention claimed is:

1. A method for simultaneously transmitting a plurality of physical uplink control channels (PUCCHs) by a user equipment (UE) in a wireless communication system, the method comprising:
receiving a downlink grant including at least one Physical Downlink Control Channel (PDCCH);
decoding the at least one PDCCH to recognize a first resource index;
determining a first Physical Uplink Control Channel (PUCCH) resource required for a first PUCCH from the first resource index and determining a second PUCCH resource required for a second PUCCH from the first resource index and an offset value; and
simultaneously transmitting Hybrid Automatic Repeat and reQuest ACKnowledgment (HARQ-ACK) information via both the first and second PUCCHs using the first and second PUCCH resources.

2. The method according to claim 1, wherein the recognizing of the first resource index includes
recognizing a lowest control channel element (CCE) used for transmission of the at least one PDCCH.

3. The method according to claim 1, wherein the first PUCCH resource is given through higher layer signaling.

4. The method according to claim 1, wherein the second PUCCH resource is inferred by adding the offset value to the first resource index.

5. The method according to claim 1, wherein the second PUCCH resource is inferred from the first PUCCH resource so that the plurality of PUCCHs is transmitted through the same physical resource block (PRB).

6. The method according to claim 1, wherein the second PUCCHs resources is obtained from the following equation:

$$(a+\delta_n) \bmod (N_{CS} \cdot N_{OC} + n_{PRB} \cdot N_{CS} \cdot N_{OC}), \text{ or}$$

$$(a-\delta_n) \bmod (N_{CS} \cdot N_{OC} + n_{PRB} \cdot N_{CS} \cdot N_{OC}) \quad \text{[Equation]}$$

where a is the first resource index, $\delta_n$ is the offset value for inferring the second PUCCH resource, $N_{CS}$ is the number of cyclic shifts (CSs) available within one PRB, $N_{OC}$ is the number of orthogonal covers (OCs) available within one PRB, and $n_{PRB}$ is a PRB index on which the first PUCCH resources exists.

7. A user equipment (UE) configured to simultaneously transmit a plurality of physical uplink control channels (PUCCHs) in a wireless communication system, said user equipment comprising:
a radio frequency (RF) unit configured to receive at least one Physical Downlink Control Channel (PDCCH) and transmit Hybrid Automatic Repeat and reQuest ACKnowledgment (HARQ-ACK) information; and
a processor configured to:
receive a downlink grant including the at least one PDCCH,
decode the at least one PDCCH to recognize a first resource index,
determine a first Physical Uplink Control Channel (PUCCH) resource required for a first PUCCH from the first resource index and determine a second PUCCH resource required for a second PUCCH from the first resource index and an offset value, and
simultaneously transmit Hybrid Automatic Repeat and reQuest ACKnowledgment (HARQ-ACK) information via both the first and second PUCCHs using the first and second PUCCH resources.

8. The user equipment (UE) according to claim 7, wherein the recognizing of the first resource index includes
recognizing a lowest control channel element (CCE) used for transmission of the at least one PDCCH.

9. The user equipment (UE) according to claim 7, wherein the first PUCCH resource is given through higher layer signaling.

10. The user equipment (UE) according to claim 7, wherein the second PUCCH resource is inferred by adding the offset value to the first resource index.

11. The user equipment (UE) according to claim 7, wherein the second PUCCH resource is inferred from the first PUCCH resource so that the plurality of PUCCHs are transmitted through the same physical resource block (PRB).

12. The user equipment (UE) according to claim 7, wherein the second PUCCH resource is obtained from the following equation:

$$(a+\delta_n) \bmod (N_{CS} \cdot N_{OC} + n_{PRB} \cdot N_{CS} \cdot N_{OC}), \text{ or}$$

$$(a-\delta_n) \bmod (N_{CS} \cdot N_{OC} + n_{PRB} \cdot N_{CS} \cdot N_{OC}) \qquad \text{[Equation]}$$

where a is the first resource index, $\delta_n$ is an offset value for inferring the second PUCCH resource, $N_{CS}$ is the number of cyclic shifts (CSs) available within one PRB, $N_{OC}$ is the number of orthogonal covers (OCs) available within one PRB, and $n_{PRB}$ is a PRB index on which the first PUCCH resources exists.

\* \* \* \* \*